US 12,208,812 B2

(12) United States Patent
Tanibata

(10) Patent No.: US 12,208,812 B2
(45) Date of Patent: Jan. 28, 2025

(54) VEHICLE DEVICE AND VEHICLE DEVICE CONTROL METHOD

(71) Applicant: DENSO CORPORATION, Kariya (JP)

(72) Inventor: Nobuhiko Tanibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 449 days.

(21) Appl. No.: 17/498,930

(22) Filed: Oct. 12, 2021

(65) Prior Publication Data

US 2022/0024466 A1 Jan. 27, 2022

Related U.S. Application Data

(63) Continuation of application No. PCT/JP2020/015032, filed on Apr. 1, 2020.

(30) Foreign Application Priority Data

Apr. 16, 2019 (JP) ................................ 2019-077777

(51) Int. Cl.
*B60W 50/00* (2006.01)
*G06F 12/084* (2016.01)

(52) U.S. Cl.
CPC .......... *B60W 50/00* (2013.01); *G06F 12/084* (2013.01); *B60W 2050/0005* (2013.01); *B60W 2050/0065* (2013.01)

(58) Field of Classification Search
CPC ............... G06F 12/0811; G06F 12/084; G06F 2212/283; G06F 15/7846; G06F 2212/62; G06F 2212/60; G06F 9/544; G06F 2009/45583; G06F 9/45558; B60R 16/0231; B60K 2370/52; B60K 2370/152; B60W 2050/146; B60W 50/04
See application file for complete search history.

(56) References Cited

U.S. PATENT DOCUMENTS

| | | | | |
|---|---|---|---|---|
| 5,860,114 A | * | 1/1999 | Sell | G06F 12/0831 711/146 |
| 6,052,632 A | * | 4/2000 | Iihoshi | H04L 12/40013 701/32.7 |
| 6,417,849 B2 | * | 7/2002 | Lefebvre | G06T 15/005 715/733 |
| 7,023,445 B1 | * | 4/2006 | Sell | G09G 5/363 345/557 |

(Continued)

FOREIGN PATENT DOCUMENTS

| | | |
|---|---|---|
| JP | H02-032450 A | 2/1990 |
| JP | 2001075917 A | 3/2001 |

(Continued)

OTHER PUBLICATIONS

U.S. Appl. No. 17/498,823, filed Oct. 12, 2021, Tanibata.
U.S. Appl. No. 17/498,885, filed Oct. 12, 2021, Tanibata.

*Primary Examiner* — Steven B Theriault
(74) *Attorney, Agent, or Firm* — Harness, Dickey & Pierce, P.L.C.

(57) ABSTRACT

A vehicle device includes a plurality of CPU modules, a plurality of cache memories respectively provided for the plurality of CPU modules, a specifying unit configured to specify a shared region shared by the plurality of CPU modules, and a region arrangement unit configured to arrange the shared region specified by the specifying unit in a main memory.

9 Claims, 21 Drawing Sheets

(56) References Cited

U.S. PATENT DOCUMENTS

| | | | |
|---|---|---|---|
| 9,064,322 B1* | 6/2015 | Wyatt | G06F 3/1438 |
| 10,007,608 B2* | 6/2018 | Galchev | G06F 9/455 |
| 10,565,672 B2* | 2/2020 | Kim | G06T 1/20 |
| 11,010,302 B2* | 5/2021 | Ma | G06N 3/08 |
| 11,175,717 B2* | 11/2021 | Kim | G06F 3/14 |
| 11,281,732 B2* | 3/2022 | Rao | G06F 16/248 |
| 2003/0018860 A1* | 1/2003 | Krueger | G06F 12/109 |
| | | | 711/163 |
| 2003/0210248 A1 | 11/2003 | Wyatt | |
| 2007/0124474 A1* | 5/2007 | Margulis | H04L 67/10 |
| | | | 709/226 |
| 2009/0184972 A1 | 7/2009 | Weybrew et al. | |
| 2009/0262132 A1 | 10/2009 | Peterson et al. | |
| 2009/0284523 A1 | 11/2009 | Peterson et al. | |
| 2009/0306885 A1* | 12/2009 | Yokoyama | G09B 29/106 |
| | | | 345/592 |
| 2009/0322752 A1 | 12/2009 | Peterson et al. | |
| 2010/0017526 A1* | 1/2010 | Jagannath | H04L 12/1859 |
| | | | 709/229 |
| 2011/0032257 A1 | 2/2011 | Peterson et al. | |
| 2011/0050698 A1 | 3/2011 | Peterson et al. | |
| 2011/0063315 A1* | 3/2011 | Ghosh | G06F 3/1423 |
| | | | 345/547 |
| 2012/0001912 A1 | 1/2012 | Peterson et al. | |
| 2012/0081383 A1* | 4/2012 | Reeves | H04L 67/131 |
| | | | 345/582 |
| 2012/0110511 A1* | 5/2012 | Howard | G01C 21/36 |
| | | | 715/835 |
| 2012/0133654 A1 | 5/2012 | Redgrave et al. | |
| 2012/0139926 A1 | 6/2012 | Clohset et al. | |
| 2012/0249553 A1 | 10/2012 | Peterson et al. | |
| 2013/0002672 A1 | 1/2013 | Peterson et al. | |
| 2013/0007488 A1* | 1/2013 | Jo | G06F 1/3287 |
| | | | 713/320 |
| 2013/0069981 A1* | 3/2013 | Mak-Fan | G09G 5/14 |
| | | | 345/629 |
| 2014/0049548 A1 | 2/2014 | Rao et al. | |
| 2014/0049551 A1 | 2/2014 | Rao et al. | |
| 2014/0052915 A1* | 2/2014 | Yamaguchi | G06F 12/0802 |
| | | | 711/119 |
| 2014/0071123 A1 | 3/2014 | Peterson et al. | |
| 2014/0111515 A1 | 4/2014 | Peterson et al. | |
| 2014/0223127 A1* | 8/2014 | Chavali | G06F 13/4068 |
| | | | 711/163 |
| 2014/0232720 A1 | 8/2014 | Peterson et al. | |
| 2014/0327630 A1* | 11/2014 | Burr | G06F 3/016 |
| | | | 345/173 |
| 2014/0380326 A1* | 12/2014 | Kurihara | G06F 9/4881 |
| | | | 718/102 |
| 2015/0039865 A1* | 2/2015 | Ishigooka | G06F 9/3001 |
| | | | 712/221 |
| 2015/0138217 A1* | 5/2015 | Czapla | G09G 5/006 |
| | | | 345/547 |
| 2015/0169456 A1* | 6/2015 | Suzuki | G06F 12/0875 |
| | | | 711/123 |
| 2015/0242990 A1 | 8/2015 | Peterson et al. | |
| 2015/0302630 A1 | 10/2015 | Peterson et al. | |
| 2015/0302820 A1* | 10/2015 | Ishiguro | G06T 1/60 |
| | | | 345/520 |
| 2016/0041912 A1* | 2/2016 | Nakajima | G06F 12/0842 |
| | | | 711/120 |
| 2016/0063753 A1 | 3/2016 | Peterson et al. | |
| 2016/0077682 A1* | 3/2016 | Reeves | H04W 4/60 |
| | | | 715/733 |
| 2016/0091949 A1* | 3/2016 | Buhot | G06F 1/324 |
| | | | 713/320 |
| 2016/0196041 A1 | 7/2016 | Lavoie | |
| 2016/0203580 A1 | 7/2016 | Rao et al. | |
| 2016/0314077 A1 | 10/2016 | Rao et al. | |
| 2016/0328254 A1* | 11/2016 | Ahmed | G06F 9/45545 |
| 2016/0328272 A1* | 11/2016 | Ahmed | G06F 9/4881 |
| 2016/0328823 A1 | 11/2016 | Rao et al. | |
| 2016/0350154 A1 | 12/2016 | Clohset et al. | |
| 2017/0006294 A1* | 1/2017 | Huang | H04N 19/439 |
| 2017/0017576 A1* | 1/2017 | Cammarota | G06F 12/0893 |
| 2017/0228920 A1 | 8/2017 | Peterson et al. | |
| 2017/0294176 A1 | 10/2017 | Ito | |
| 2017/0316541 A1* | 11/2017 | Kim | G09G 5/363 |
| 2018/0074727 A1* | 3/2018 | Zhao | G06F 9/544 |
| 2018/0174349 A1 | 6/2018 | Yang et al. | |
| 2018/0181287 A1* | 6/2018 | O'Brien | G06F 3/0482 |
| 2018/0196751 A1* | 7/2018 | Giamei | G06F 12/0842 |
| 2018/0260184 A1* | 9/2018 | Hardacker | G09G 5/395 |
| 2018/0300840 A1* | 10/2018 | Ray | G09G 5/003 |
| 2018/0307624 A1* | 10/2018 | Zmora | G06F 12/084 |
| 2018/0336136 A1* | 11/2018 | Hijaz | G06F 12/0215 |
| 2019/0009796 A1* | 1/2019 | Fujii | B60W 50/14 |
| 2019/0026231 A1* | 1/2019 | Kottilingal | G06F 9/45558 |
| 2019/0087254 A1* | 3/2019 | Ohkubo | G06F 12/0826 |
| 2019/0114267 A1 | 4/2019 | Rao et al. | |
| 2019/0122419 A1 | 4/2019 | Peterson et al. | |
| 2019/0155727 A1* | 5/2019 | Getta | G06F 12/109 |
| 2019/0258251 A1* | 8/2019 | Ditty | G06V 20/58 |
| 2019/0302180 A1* | 10/2019 | Woo | G06F 11/3089 |
| 2019/0303084 A1* | 10/2019 | Lees | G06T 1/60 |
| 2020/0293104 A1* | 9/2020 | Kim | G06F 1/3206 |
| 2020/0293367 A1* | 9/2020 | Andrei | G06F 13/4282 |
| 2020/0294301 A1* | 9/2020 | Surti | G06T 17/20 |
| 2020/0326969 A1* | 10/2020 | Hayes | G06F 11/2028 |
| 2020/0394832 A1 | 12/2020 | Peterson et al. | |
| 2021/0026769 A1* | 1/2021 | Bhandaru | G06F 9/5016 |
| 2021/0264559 A1* | 8/2021 | Roper | G06F 9/45558 |
| 2021/0294599 A1* | 9/2021 | Fitzpatrick | G06F 8/73 |
| 2022/0024315 A1* | 1/2022 | Tanibata | G09G 5/00 |
| 2022/0027276 A1* | 1/2022 | Tanibata | G06F 12/0802 |
| 2022/0222129 A1* | 7/2022 | Wang | G06F 9/52 |
| 2023/0137438 A1* | 5/2023 | Vaidyanathan | G06F 9/30025 |
| | | | 345/426 |
| 2024/0086340 A1* | 3/2024 | Persson | G06F 12/0223 |

FOREIGN PATENT DOCUMENTS

| | | |
|---|---|---|
| JP | 2005524907 A | 8/2005 |
| JP | 2010026297 A | 2/2010 |
| JP | 2011510407 A | 3/2011 |
| JP | 2012502395 A | 1/2012 |
| JP | 2015526806 A | 9/2015 |
| JP | 2016097928 A | 5/2016 |
| JP | 2017523499 A | 8/2017 |
| JP | 2017191145 A | 10/2017 |
| JP | 2017208124 A | 11/2017 |
| JP | 2018503209 A | 2/2018 |
| JP | 2018139128 A | 9/2018 |

\* cited by examiner

COMPARATIVE EXAMPLE: SEQUENCE

COMPARATIVE EXAMPLE: SCREEN TRANSITION

EMBODIMENT: SEQUENCE

EMBODIMENT: SCREEN TRANSITION

COMPARATIVE EXAMPLE

VEHICLE DEVICE AND VEHICLE DEVICE CONTROL METHOD

CROSS REFERENCE TO RELATED APPLICATIONS

This application is a continuation application of International Patent Application No. PCT/JP2020/015032 filed on Apr. 1, 2020, which designated the U.S. and claims the benefit of priority from Japanese Patent Application No. 2019-077777 filed on Apr. 16, 2019. The entire disclosure of all of the above application is incorporated herein by reference.

TECHNICAL FIELD

The present disclosure relates to a vehicle device and a vehicle device control method.

BACKGROUND ART

In related arts, a display device provided in a vehicle is controlled by an individual device.

SUMMARY

One aspect of the present disclosure is a vehicle device that includes a plurality of CPU modules, a plurality of cache memories respectively provided for the plurality of CPU modules, a specifying unit configured to specify a shared region shared by the plurality of CPU modules, and a region arrangement unit configured to arrange the shared region specified by the specifying unit in a main memory.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
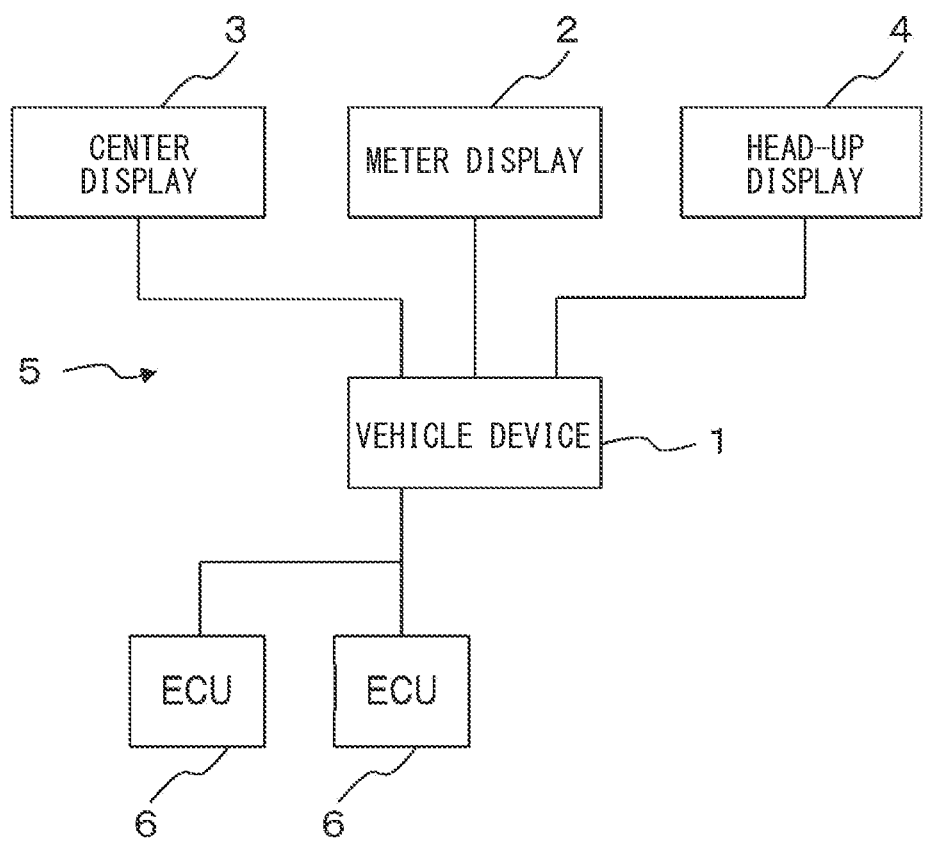
FIG. 1 is a diagram showing a configuration example of a cockpit system according to a first embodiment.

Next, a relevant technology is described only for understanding the following embodiments. In recent years, a cockpit system in which multiple display devices are provided has been widely adopted in the vehicle. In this case, when the display devices are controlled by the individual device, there is a possibility that a seamless user interface cannot be implemented due to a limitation of a band between the devices, delay of synchronization, and the like. Therefore, by integrating control of the display devices into one vehicle device, the limitation of a band and the delay of synchronization described above are desired to be eliminated.

However, as a result of an integration of the control of the display devices into one vehicle device, a problem newly occurs in that a load on a cache memory or a bus of the vehicle device increases. The problem becomes more remarkable as a size and a definition of the display device are increased.

For example, in a case of displaying multiple contents, it is necessary to share the contents across a CPU module and an operating system, and it is expected that the load on the cache memory or the bus is further increased. Therefore, it is strongly required to reduce the load on the cache memory or the bus.

An object of the present disclosure is to provide a vehicle device and a vehicle device control method that can reduce a load on a cache memory or a bus.

As described above, one aspect of the present disclosure is a vehicle device that includes a plurality of CPU modules, a plurality of cache memories respectively provided for the plurality of CPU modules, a specifying unit configured to specify a shared region shared by the plurality of CPU modules, and a region arrangement unit configured to arrange the shared region specified by the specifying unit in a main memory.

Another aspect of the present disclosure is a control method of a vehicle device including a plurality of CPU module. The control method includes specifying a shared region shared by the plurality of CPU modules, and arranging the specified shared region in a main memory.

Accordingly, a shared region can be shared among CPU modules by being formed in a main memory, and regions other than the shared region are not formed in the main memory. Therefore, unnecessary write-back and snoop do not occur, and the load on the cache memory or the bus can be reduced.

Hereinafter, first, a basic configuration, a use case, and a method for solving a problem occurring in the use case according to first to fifth embodiments will be described, and then, a method for reducing a load on a cache memory or a bus according to a sixth embodiment will be described. In the following description, the same reference numerals are given to substantially the same portions according to the embodiments.

First Embodiment

Next, the first embodiment will be described. As shown in FIG. 1, the vehicle device 1 constitutes, for example, a cockpit system 5 including three display devices which are a meter display 2, a center display 3, and a head-up display 4.

The meter display 2 is, for example, a liquid crystal display or an organic EL display, and is assumed to be provided in the vicinity of the front of a driver on a dashboard. The center display 3 is, for example, a liquid crystal display or an organic EL display, and is assumed to be provided in the vicinity of a center console.

The head-up display 4 is, for example, a liquid crystal display, an organic EL display, or a projector that projects an image onto a front window, and is assumed to be provided in the vicinity of the front of the driver on the dashboard. However, the number, the arrangement, or the configuration of the display devices is merely an example, and the disclosure is not limited thereto.

Although FIG. 1 shows an example in which the vehicle device 1 is connected to multiple display devices, the vehicle device 1 according to the first embodiment is intended to synchronize surfaces in one user interface, as will be described later. Therefore, the number of the display devices connected to the vehicle device 1 may be one or more.

The vehicle device 1 is communicably connected to some electronic control devices 6 (hereinafter, referred to as ECUs 6) provided in a vehicle. Although the vehicle device 1 can also be considered as one of the ECUs 6, in the present specification, the vehicle device 1 and the ECU 6 are illustrated as separated from each other in order to facilitate understanding.

Figure 2:
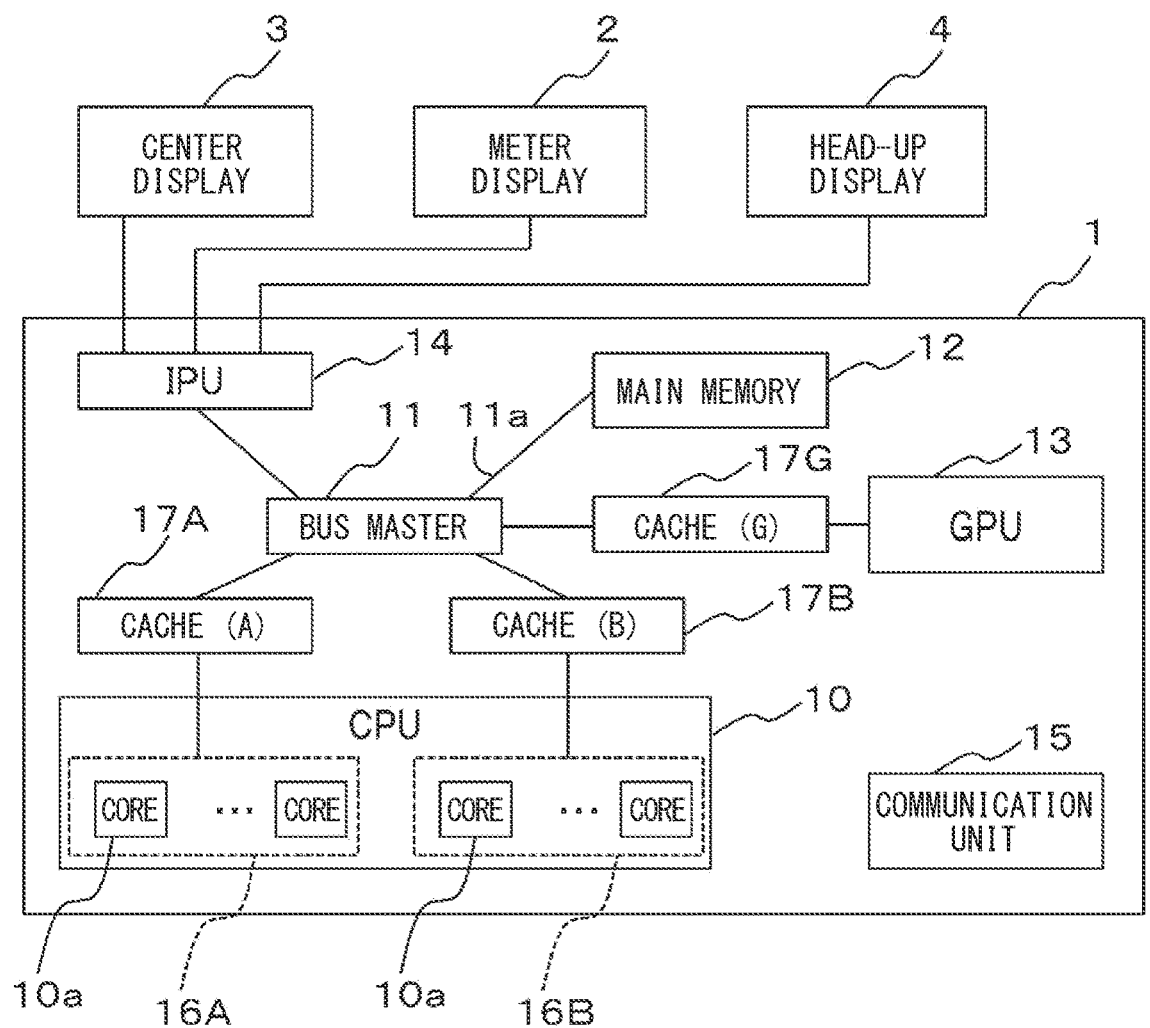
FIG. 2 is a diagram showing an electrical configuration example of a vehicle device.

As shown in FIG. 2, the vehicle device 1 includes a CPU 10, a bus master 11, a main memory 12, a graphic processing unit 13 (hereinafter, referred to as a GPU 13), an image processing unit 14 (hereinafter, referred to as an IPU 14), a communication unit 15, and the like.

As will be described later, the GPU 13 is a functional unit that actually draws a surface instructed by an application program. In brief, the surface is image data that is a source of a content image displayed at a certain moment. The IPU 14 is a functional unit that outputs the drawn surface to the display devices as a video signal.

The CPU 10 includes multiple cores 10*a*. Here, as an example, the number of the cores 10*a* is eight. The eight cores 10*a* are divided into two four-core groups, and are allocated to two CPU modules 16A and 16B. That is, a plurality of CPU modules 16 capable of operating independently of one another in terms of functions are provided in the vehicle device 1.

The CPU module 16A is allocated to an application group 22A that relatively requires a real-time property, and the CPU module 16B is allocated to an application group 22B that does relatively not require the real-time property. Hereinafter, when a description common to the CPU module 16 is given, the CPU module 16 is simply referred to as the CPU module 16 without adding A or B.

Each of the CPU modules 16 and the GPU 13 is provided with a respective dedicated cache memory 17. Hereinafter, a unit provided for the CPU module 16A is referred to as a cache 17A for the sake of convenience, a unit provided for the CPU module 16B is referred to as a cache 17B for the sake of convenience, and a unit provided for the GPU 13 is referred to as a cache 17G for the sake of convenience. The cache memories 17 are connected to the main memory 12 and the IPU 14 via a bus 11*a* (a second bus) and the bus master 11, respectively, and are capable of transmitting and receiving data to and from the main memory 12 and the IPU 14.

The communication unit 15 communicates with another ECU 6. The communication unit 15 includes, for example, a controller area network interface. Depending on a type of the ECU 6, for example, a wireless communication method such as Wifi or a wired communication method such as USB may be used.

Figure 3:
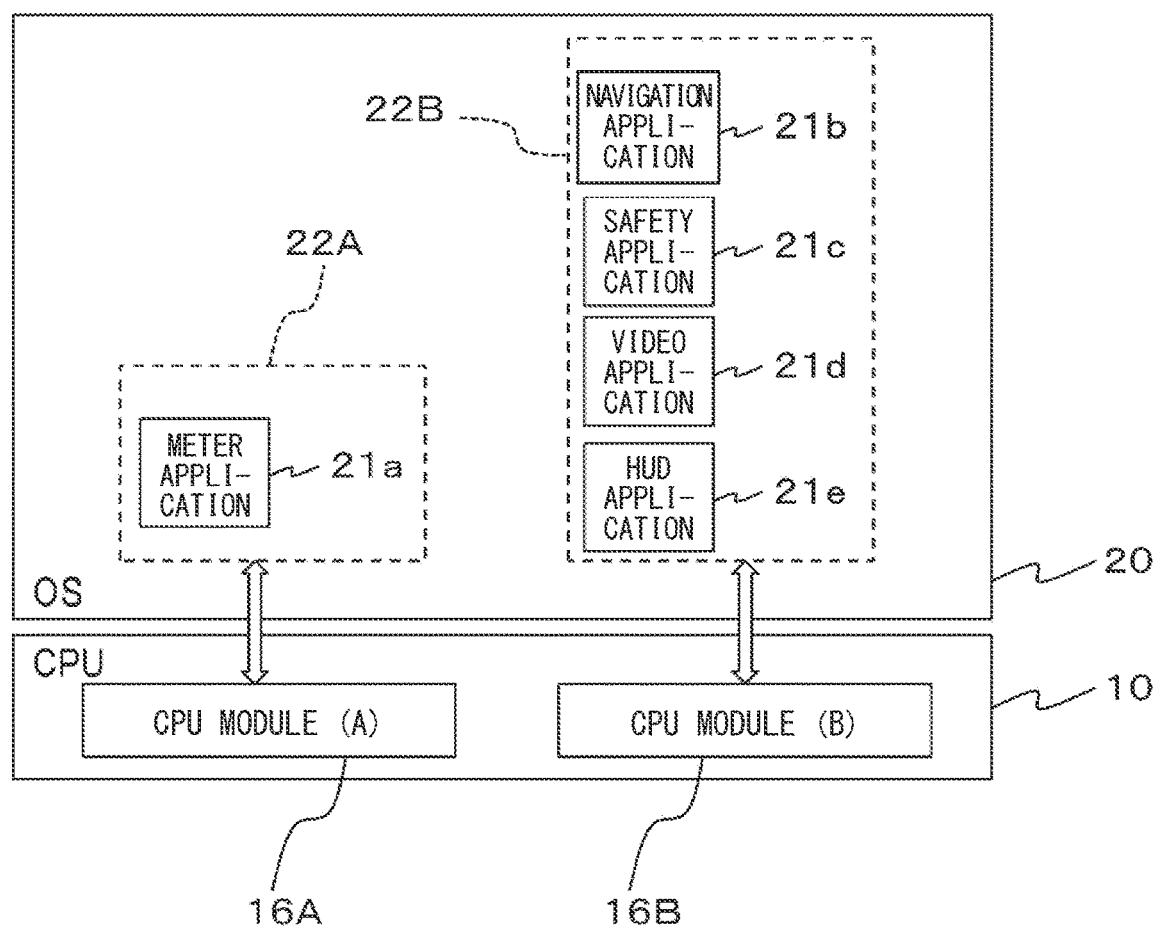
FIG. 3 is a diagram showing a software configuration example of the vehicle device.

As shown in FIG. 3, in the vehicle device 1, an operating system 20 (hereinafter, referred to as an OS 20) is executed on the CPU 10, and multiple application programs 21 (hereinafter, referred to as applications 21) are executed on the OS 20. As the applications 21 executed on the OS 20, a meter application 21*a*, a navigation application 21*b*, a safety application 21*c*, a video application 21*d*, an HUD application 21*e*, and the like are provided. HUD is an abbreviation for head up display. The applications 21 are an example, and the applications 21 executed on the OS 20 are not limited thereto.

The meter application 21*a* notifies the user of a speed, the number of revolutions, a warning, or the like of the vehicle, and mainly draws the surface displayed on the meter display 2. For example, the meter application 21*a* draws, as the user interface 23 shown as a normal display mode in FIG. 4, the surface for displaying a content, such as a speedometer M1, a tachometer M2, or a warning light M3.

However, the surface drawn by the meter application 21*a* can also be displayed on the center display 3 or the head-up display 4. The surface drawn by the meter application 21*a* is relatively required to have the real-time property (in other words, a real time response) as compared with the surface drawn by the other exemplified applications 21. Although the meter application 21*a* instructs the GPU 13 to draw the surface in practice, here, it is expressed that the meter application 21 is to draw the surface for the sake of simplicity. Here, similar applies to the other applications 21.

The navigation application 21*b* implements a navigation function and draws a surface mainly displayed on the center display 3. For example, as shown in FIG. 5, the navigation application 21*b* draws a surface for displaying a content such as a navigation screen M4 including a map, a current position of the vehicle, and the like. However, the surface drawn by the navigation application 21b can be displayed on the meter display 2 as a navigation display mode shown in FIG. 4, for example, and can also be displayed on the head-up display 4.

The safety application 21c implements various functions of displaying a menu and driving support, and draws a surface mainly displayed on the center display 3. For example, as shown in FIG. 5, the safety application 21c draws a surface for displaying a content such as multiple icons M5 for selecting a target function or a content. However, the surface drawn by the safety application 21c can be also displayed on the meter display 2 as a menu display mode shown in FIG. 4, for example, and can also be displayed on the head-up display 4.

Figure 6:
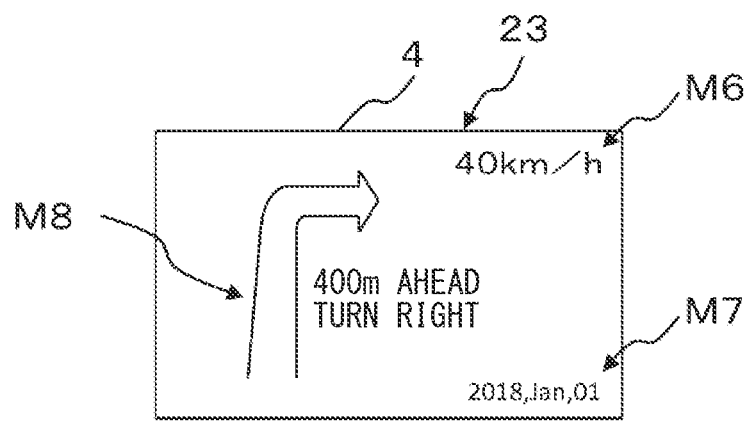
FIG. 6 is a diagram showing an example of a display mode of a head-up display.

The HUD application 21e notifies the user of, for example, a speed, a future course, and the like, and draws a surface mainly displayed on the head-up display 4. For example, as shown in FIG. 6, the HUD application 21e draws a surface for displaying current speed information M6, time information M7, or course information M8 indicating a distance to a corner, a turning direction, and the like. However, the surface drawn by the HUD application 21e can also be displayed on the meter display 2 or the center display 3.

Figure 7:
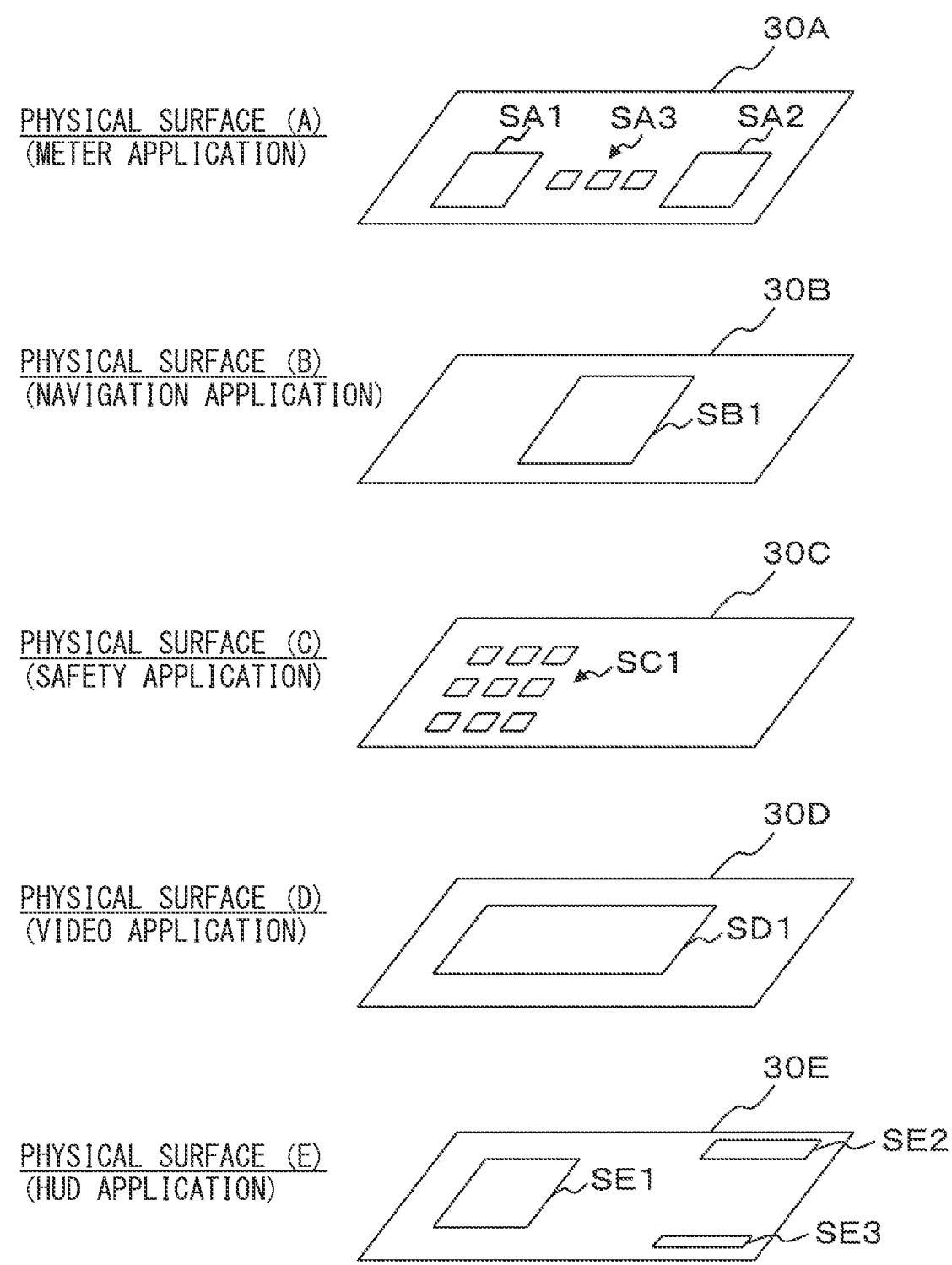
FIG. 7 is a diagram showing an example of a physical surface allocated to each application.

As shown in FIG. 7, a physical surface 30 for drawing the surface is individually allocated to each of the applications 21. That is, the application 21 functions as a drawing unit that draws a surface, which is a content holding unit, on the physical surface 30 allocated to the application 21. Although details will be described later, the applications 21 corresponds to a synchronization unit that loads in a surface, which is a content holding unit, into the physical surface 30 allocated to the application 21 and that synchronizes the surface.

The physical surfaces 30 are secured in a size such that necessary surfaces can be drawn, that is, provided on the cache memory 17 or the main memory 12. A size of the physical surface 30 does not need to be equal to the number of pixels of the display device. The above is because a necessary surface is selected from the surfaces drawn on the physical surface 30 and displayed on the display device.

In the present embodiment, a physical surface 30A is allocated to the meter application 21a, a physical surface 30B is allocated to the navigation application 21b, a physical surface 30C is allocated to the safety application 21c, a physical surface 30D is allocated to the video application 21d, and a physical surface 30E is allocated to the HUD application 21e. Then, one or more surfaces are drawn on the physical surfaces 30 by the applications 21.

For example, surfaces SA1 to SA3 are drawn on the physical surface 30A by the meter application 21a. Similarly, a surface SB1 is drawn on the physical surface 30B by the navigation application 21b. Surfaces SC1 and SC2 are drawn on the physical surface 30C by the safety application 21c. In FIG. 7, for simplification of description, multiple surfaces drawn by the safety application 21c are collectively referred to as the surface SC1. A surface SD1 is drawn on the physical surface 30D by the video application 21. Surfaces SE1 to SE3 are drawn on the physical surface 30E by the HUD application 21e. The above surfaces are examples.

At least one of the contents displayed on the display devices executes an animation operation. Here, the animation operation is a display mode in which a position and a size of an image indicating the content gradually change, the image rotates, the user interface 23 moves as a whole along with a swipe operation, the image gradually fades in or fades out, the color of the image changes, and the like.

Figure 4:
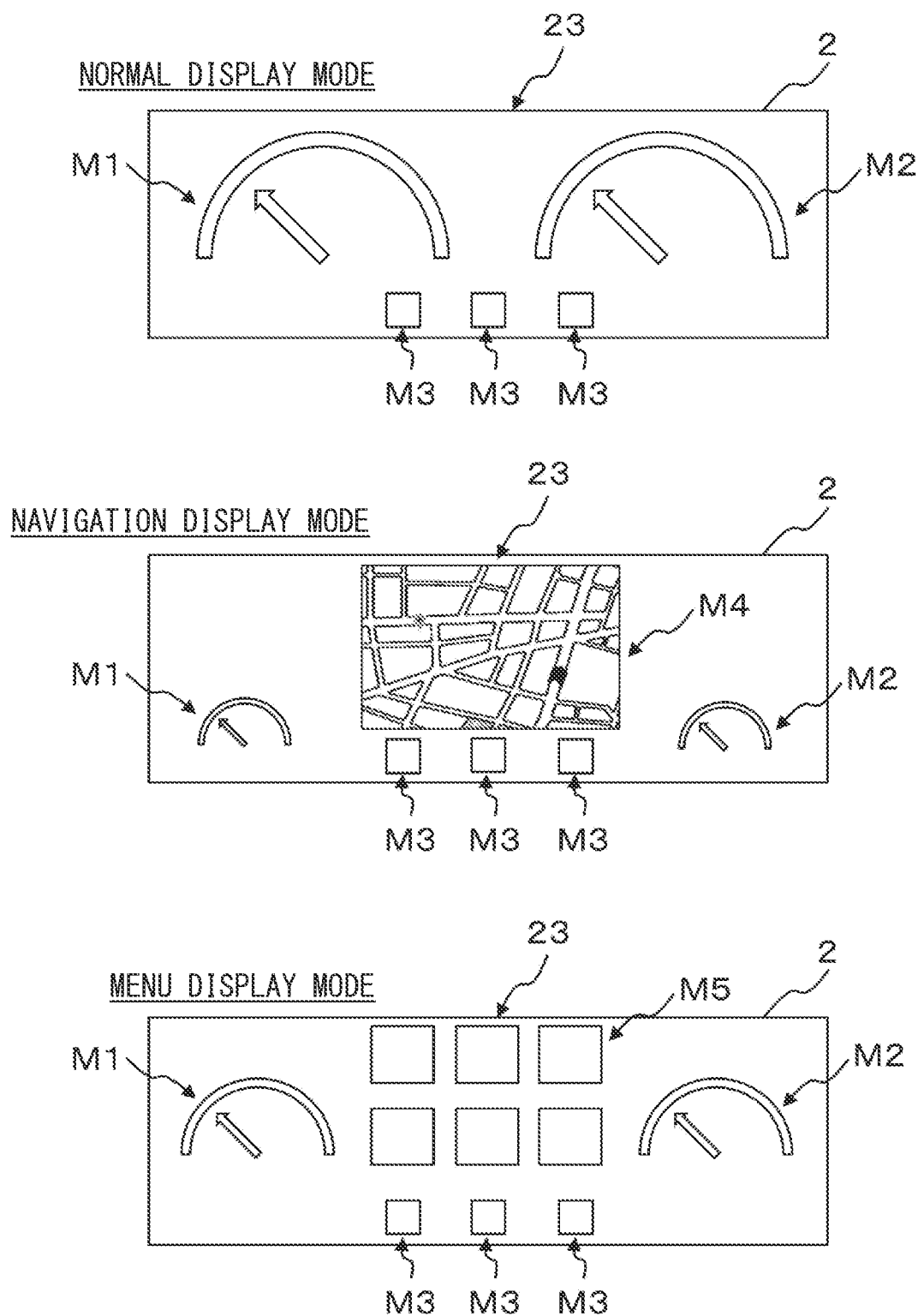
FIG. 4 is a diagram showing an example of a display mode of a meter display.
Figure 5:
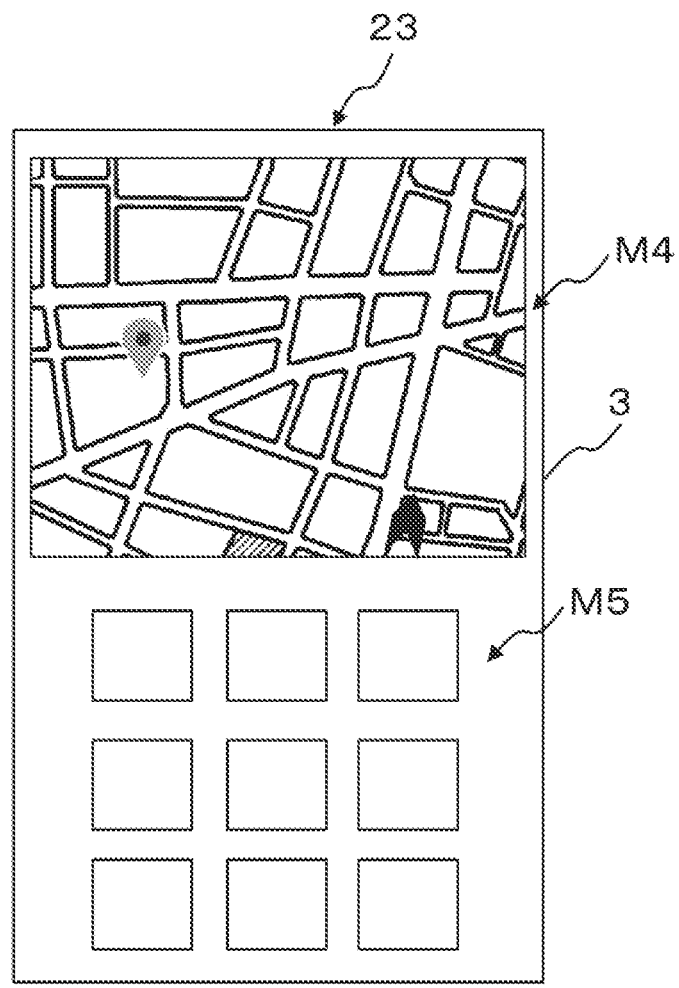
FIG. 5 is a diagram showing an example of a display mode of a center display.

For example, as shown in FIG. 4, the speedometer M1, the tachometer M2, a map, a menu, or the like are a content whose size and position change depending on a display mode or the display device at a display destination. However, the animation operation is not limited thereto, and any animation operation in which the display mode changes continuously or intermittently from a certain time point is included.

Next, an operation of the above-described configurations will be described.

As described above, the physical surfaces 30 are individually allocated to the applications 21, and the applications 21 individually draw a surface on the physical surfaces 30. At this time, if display is executed by a method in the related arts in which the IPU 14 combines the surfaces drawn on the physical surfaces 30, a synchronization deviation of the displayed content would occur.

Figure 8:
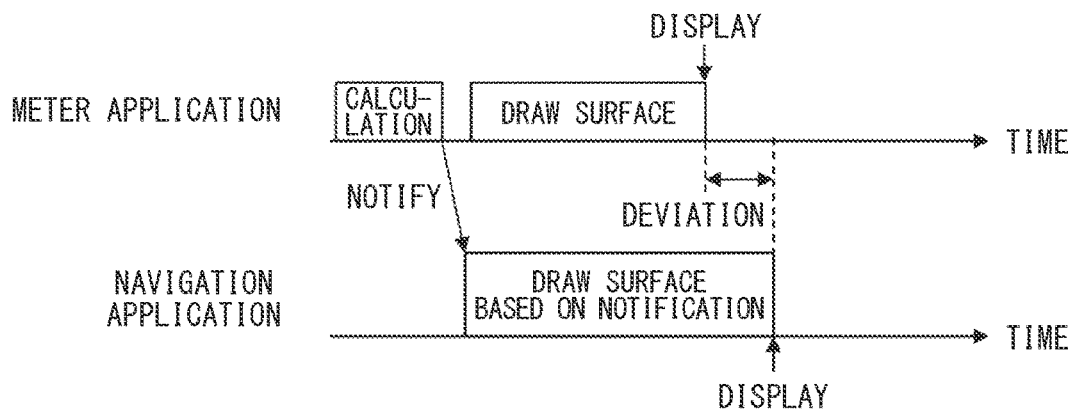
FIG. 8 is a diagram showing an example of a display mode according to a method in related arts as a comparative example.
Figure 8:
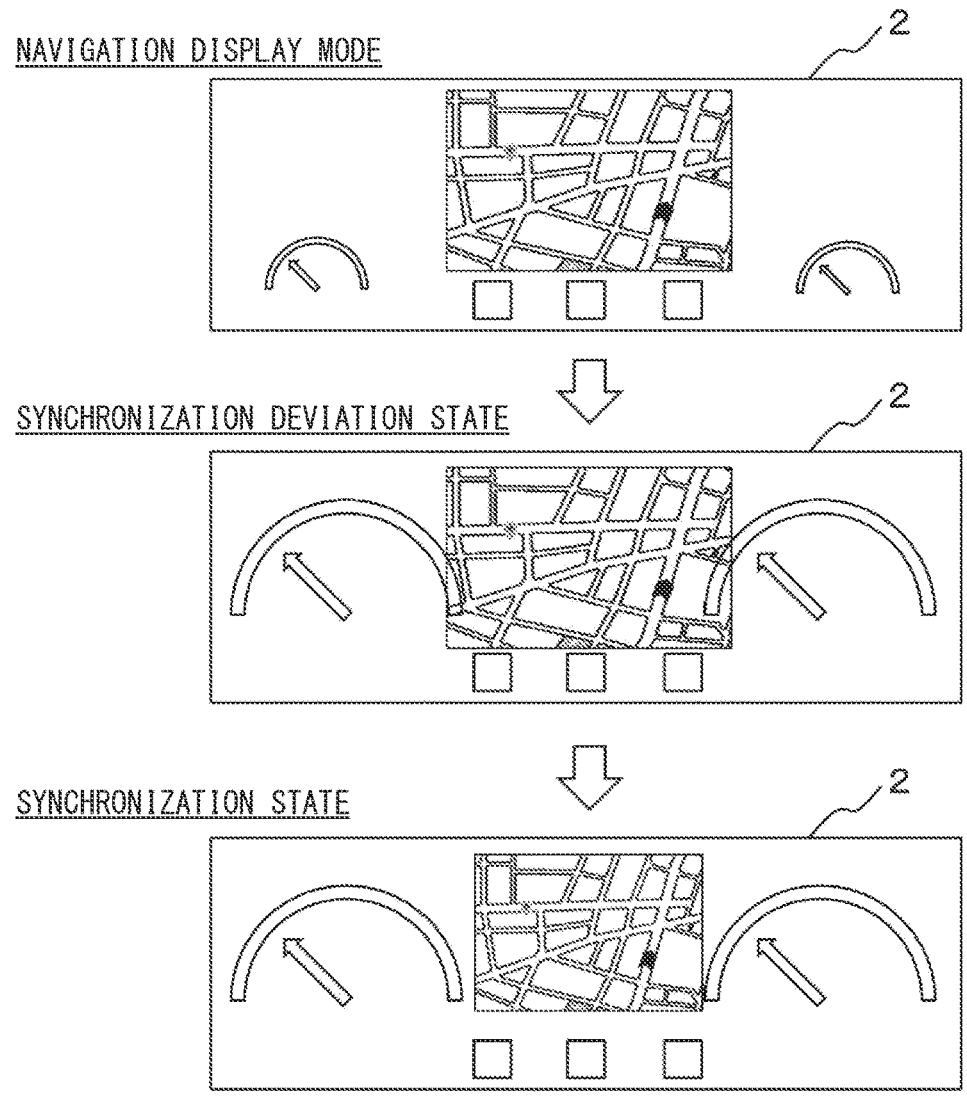

The above is because a timing at which the drawing of the surface is completed may be different for each application 21. Here, by using a method in the related arts, in a comparative example shown in FIG. 8, in the navigation display mode of a screen transition, it is assumed that the animation operation of displaying, in an enlarged manner, the speedometer M1 and the tachometer M2 is performed. In FIG. 8, the reference numerals of the contents are omitted.

In this case, since it is necessary to relatively reduce the map, in the comparative example shown in FIG. 8, as shown in the sequence, the meter application 21a first calculates the size and the position of the surface to be updated, notifies the navigation application 21b of a calculation result, and draws the surface in accordance with the size and the position after the update. On the other hand, when the navigation application 21b receives a notification from the meter application 21a, the navigation application 21b specifies the size and the position of the surface after the update based on the notification, and draws the new surface, that is, executes the update such that the new surface has the size and the position.

At this time, if the drawing of the surface has been completed first on a meter application 21a side, the IPU 14 combines and displays the surface at that time point. However, since the drawing of the surface is not completed on a navigation application 21b side, an original surface is displayed as it is. As a result, as a synchronization deviation state shown in FIG. 8, the speedometer M1 and the tachometer M2 may overlap the navigation screen M4.

After that, when the drawing of the surface in the navigation application 21b is completed, each surface is displayed in an intended state as a synchronous state shown in FIG. 8. The synchronization deviation shown in FIG. 8 is an example, and for example, when a menu is displayed in a frame, a synchronization deviation in which the menu does not move even when the frame is moved may occur.

As described above, when the method in the related arts is used, surfaces drawn on different physical surfaces 30 cannot be properly synchronized with a display deviation or the like. Since the synchronization at the time of displaying on the display device is deviated, the user may visually recognize the surface and may have a feeling of unfitting.

In view of the above, in the vehicle device 1, the surfaces drawn on the different physical surfaces 30 are synchronized in the following manner. Although the following processes can be executed by any application 21, here, a case in which the surface of the speedometer M1 or the like drawn by the meter application 21a and the surface of the navigation screen M4 drawn by the navigation application 21b are synchronized will be described as an example in comparison with the example in FIG. 8 described above.

Figure 9:
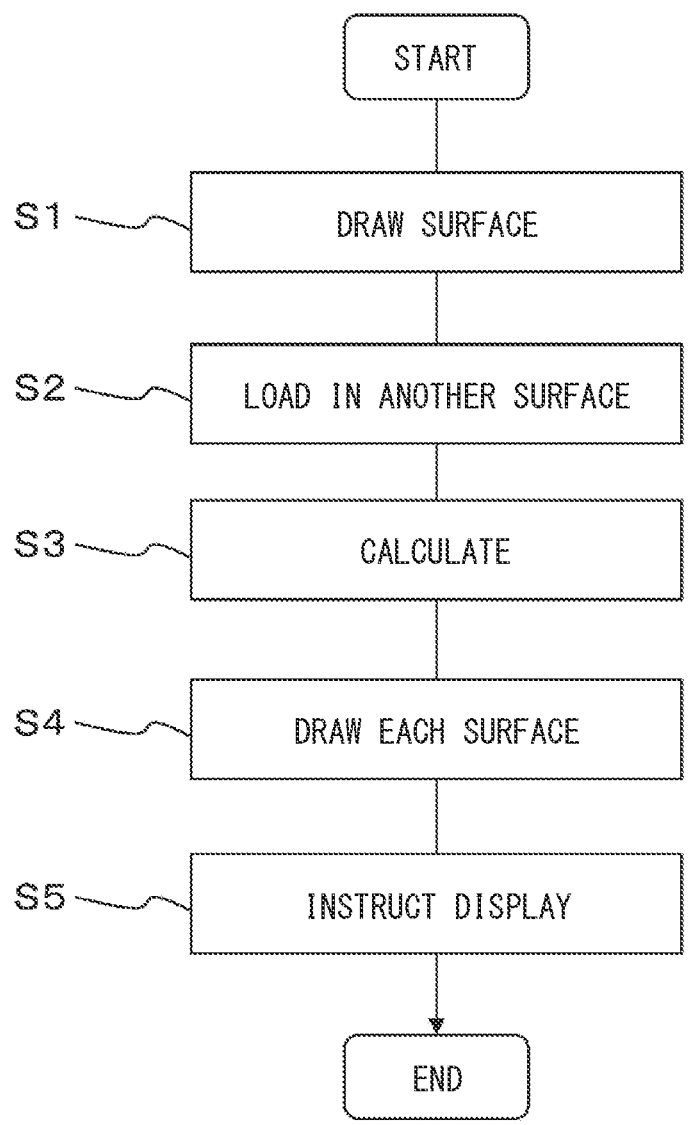
FIG. 9 is a diagram showing a flow of synchronization processing.

The meter application 21a executes the synchronization processing shown in FIG. 9, and draws the surfaces SA1 to SA3 on the physical surface 30A allocated to the meter application 21a in step S1 as shown in FIG. 7. For example, the meter application 21a draws the surface SA1 for displaying the speedometer M1, the surface SA2 for displaying the tachometer M2, and the surface SA3 for displaying the warning light M3.

Figure 10:
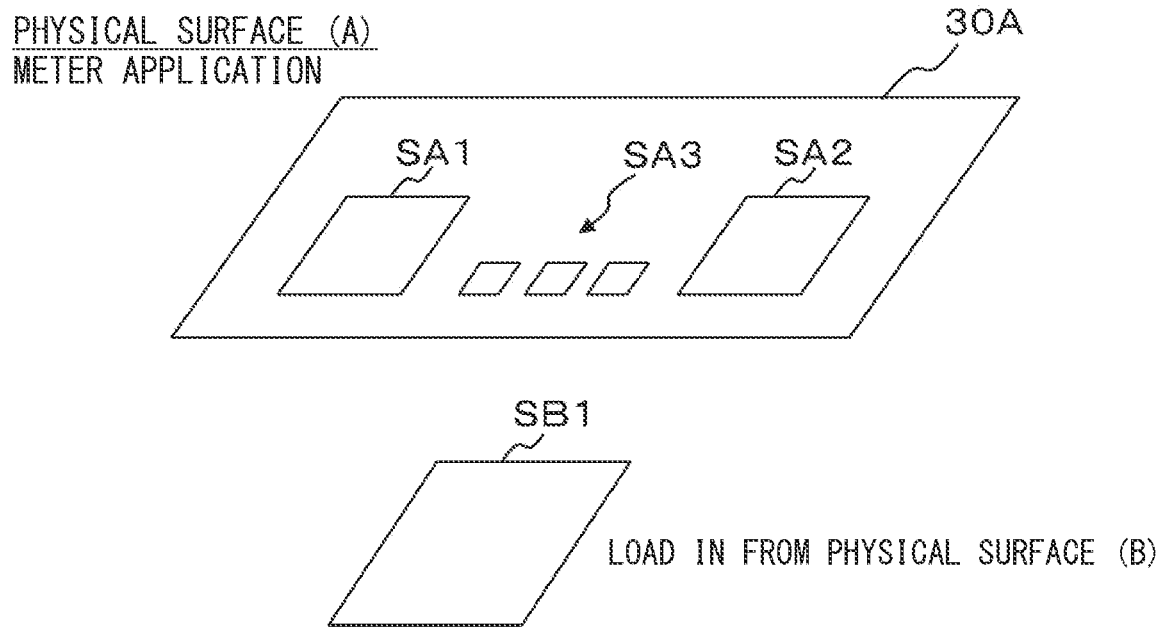
FIG. 10 is a diagram showing an example of a mode of loading in a surface.
Figure 10:
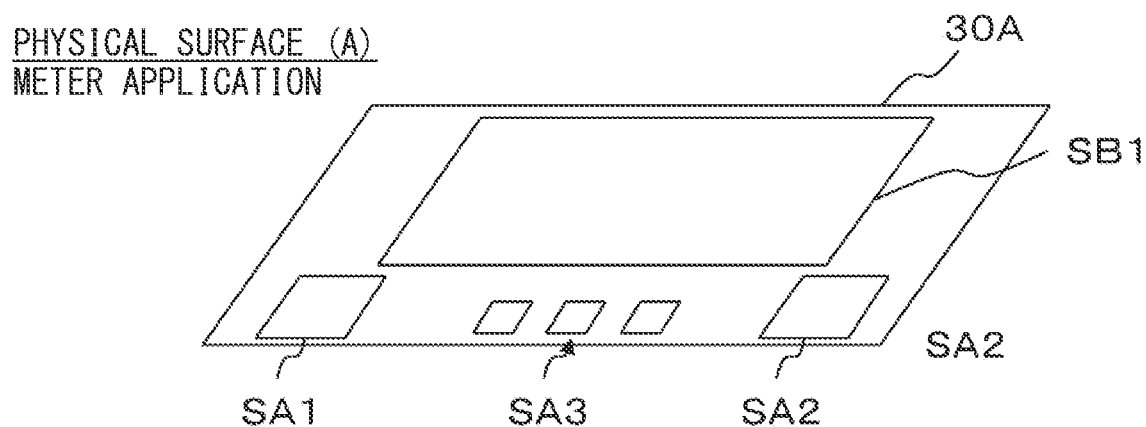

Then, in step S2 in the synchronization processing, the meter application 21a loads in the surface drawn on the other physical surface 30. In this case, as shown in FIG. 10, the meter application 21a loads in the surface SB1 drawn on the other physical surface 30B by the navigation application 21b into the physical surface 30A on which the surfaces SA1 to SA3 are drawn. At a time point of loading in, the surface SB1 has a size and a shape when drawn by the navigation application 21b.

Subsequently, in step S3 in the synchronization processing, the meter application 21a calculates a position, a size, a deforming amount, or the like of the surfaces including the surfaces SA1 to SA3 drawn by the meter application 21a and the loaded-in surface SB1. That is, the meter application 21a treats the loaded-in surface SB1 as a texture, and calculates the position, the size, or the deforming amount of the texture, thereby processing the surface SB1 as a surface drawn by the meter application 21a in a pseudo manner.

When the calculation is completed, the meter application 21a draws each surface on the physical surface 30A of the meter application 21a according to a calculation result in step S4 in the synchronization processing. Accordingly, as shown in FIG. 10, the surfaces SA1 to SA3 drawn by the meter application 21a and the surface SB1 drawn by the navigation application 21b are drawn on the physical surface 30A in accordance with the calculated size and position. That is, each surface is redrawn or rearranged according to the calculation result.

At this time, the surface SB1 drawn on the other physical surface 30B is separated from the physical surface 30B at a time point when the surface SB1 is loaded in into the physical surface 30A. Therefore, regardless of a drawing operation of the navigation application 21b, the surface SB1 can be displayed on the meter application 21a side with an appropriate size, position, or deformation amount.

Therefore, in step S5 in the synchronization processing, the meter application 21a can display each surface in an appropriate state by instructing display of each surface for which redrawing or rearrangement has been completed. This means that, when an animation operation is executed, the navigation screen M4 is reduced as the speedometer M1 and the tachometer M2 are enlarged, and a display can be seamlessly changed without overlapping the speedometer M1, the tachometer M2, and the navigation screen M4.

Figure 11:
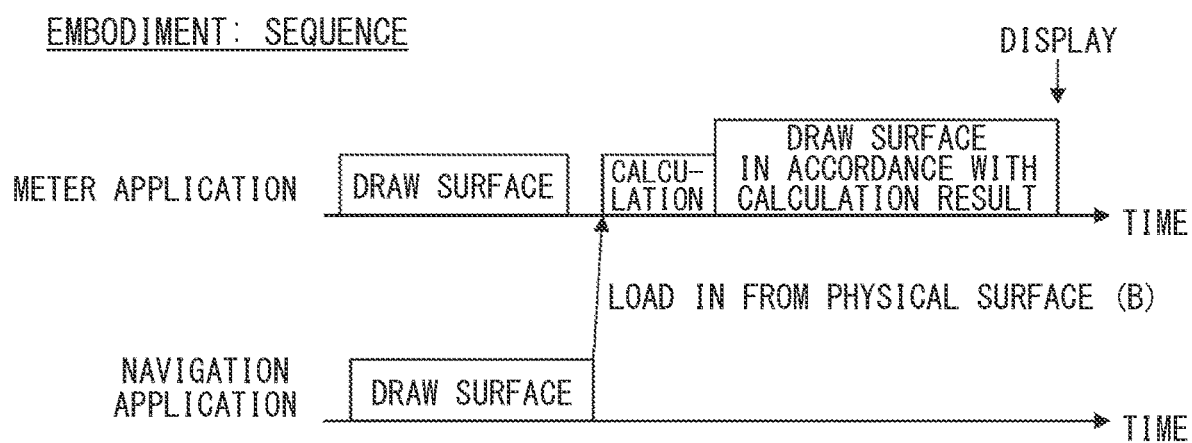
FIG. 11 is a diagram showing an example of a display mode of the vehicle device.
Figure 11:
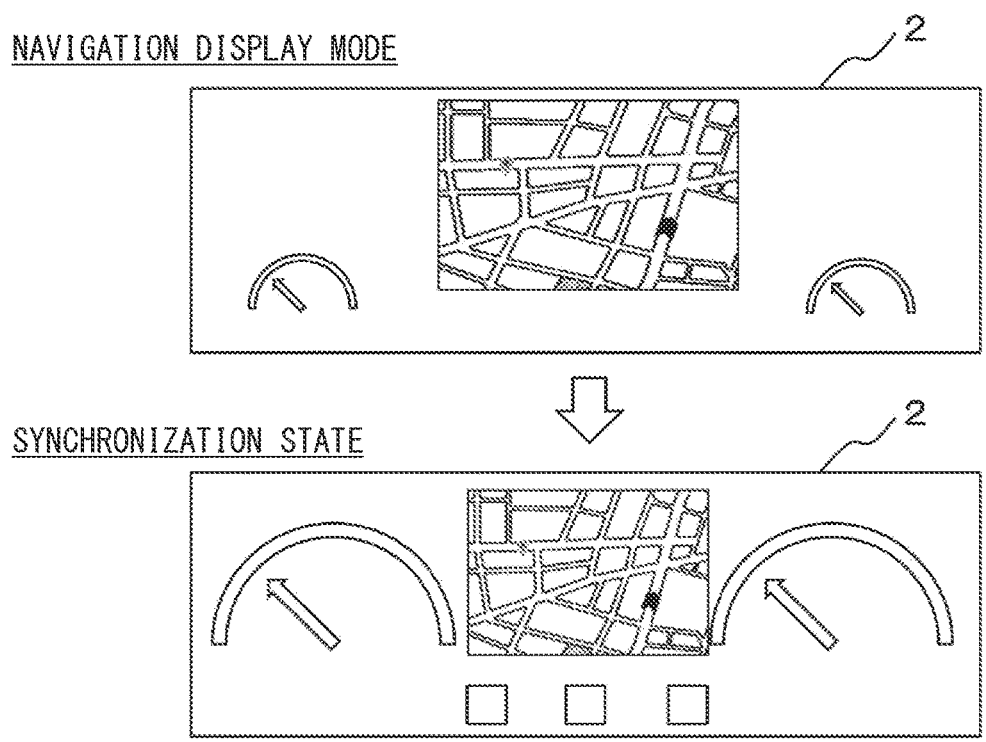

More specifically, in the vehicle device 1, as a sequence according to the embodiment shown in FIG. 11, each application 21 draws a surface. Then, the application 21 requiring the surface drawn on the other physical surface 30, here, the meter application 21a loads in the surface drawn by the navigation application 21b into the physical surface 30 of the meter application 21a, calculates the position, size, and the like of the loaded in surface, and redraws the surface.

Accordingly, for example, when the meter application 21a executes an animation operation in which the speedometer M1 or the tachometer M2 is displayed in an enlarged manner, on the meter application 21a side, the size, the position, and the like of the surface drawn on the different physical surface 30 so as to correspond to the animation operation can be controlled. Accordingly, as shown in the embodiment: screen transition, the speedometer M1 and the tachometer M2 are prevented from overlapping the navigation screen M4. That is, it is possible to synchronize the surfaces drawn on the different physical surfaces 30. In FIG. 11, the reference numerals of the contents are omitted.

According to the embodiment described above, following effects can be attained.

The vehicle device 1 can provide multiple contents by one user interface 23, and includes a synchronization unit that synchronizes the surfaces which are content holding units. Then, the synchronization unit loads in a surface drawn on the other physical surface 30 different from the physical surface 30 allocated to the synchronization unit and treats the loaded in surface as the surface drawn by the synchronization unit, thereby synchronizing the surface drawn by the synchronization unit with the surface drawn on the other physical surface 30.

Accordingly, even if the surface is drawn on the different physical surface 30, when the surface is displayed on the user interface 23, the synchronization unit can control the timing at which the display is updated. That is, it is possible to share the surface drawn on the other physical surface 30. Accordingly, the surfaces drawn on the different physical surfaces 30 can be synchronized. More specifically, the surface drawn by the synchronization unit and the surface drawn on the other physical surface 30 can be synchronized, and a state in which the user can visually recognize the surface, which is the display deviation or the like, can be avoided.

The control method of the vehicle device 1 includes a step of drawing the surface, which is the content holding unit, on the physical surface 30 allocated to the vehicle device 1 when a plurality of contents are provided by one user interface 23, a step of loading in a surface drawn on the other physical surface 30 different from the physical surface 30 allocated to the vehicle device 1, and a step of synchronizing the surface drawn by the vehicle device 1 with the surface drawn on the other physical surface 30 by treating the loaded in surface as the surface drawn by the vehicle device 1.

According to such a control method of the vehicle device 1 as well, the surfaces drawn on different physical surfaces 30 can be synchronized with each other, and the surface drawn by the vehicle device 1 and the surface drawn on the other physical surface 30 can be synchronized with each other.

In the vehicle device 1, at least one of the contents is subjected to the animation operation. In a case in which the animation operation is executed on the content, if the original surfaces are not synchronized with each other, the display of the content may be deviated, overlapped, or the like, which may cause unfitting that the user can visually recognize. Therefore, by synchronizing the original surfaces, even when the position and the size of the content are changed, the above-described unfitting can be prevented from occurring.

In the vehicle device 1, multiple applications 21 are executed, and the synchronization unit is implemented as the application 21, and synchronizes a surface drawn by the synchronization unit with a surface drawn on the other physical surface 30 by another application 21. Accordingly, an excessive load can be restricted from being applied to the applications 21.

Therefore, as in the meter application 21a according to the embodiment, the application 21 that draws a surface relatively requiring the real-time property as compared with the surface drawn on the other physical surface 30 can synchronize the surface relatively requiring the real-time property with the surface drawn on the other physical surface 30 without delaying the display of the speedometer M1, the tachometer M2, or the warning light M3 that is required.

The vehicle device 1 includes multiple CPU modules 16, and the synchronization unit synchronizes a surface drawn by the synchronization unit with a surface drawn on the other physical surface 30 provided on another CPU module 16 side. In this case, since the physical surface 30 is managed for each CPU module 16, the physical surface 30A on which the meter application 21a draws the surface and the physical surface 30B on which the navigation application 21b draws the surface are shared across the CPU modules 16. With such a configuration, by employing the above-described control method, the surfaces drawn on the different physical surfaces 30 can be synchronized.

Second Embodiment

Next, a second embodiment will be described. In the second embodiment, a configuration example of a vehicle device 1 different from that according to the first embodiment will be described. In order to simplify the description, the vehicle device 1, an OS 20, or an application 21 will be described with common reference numerals. A method of a synchronization control and the like are similar as those according to the first embodiment.

First Configuration Example

Figure 12:
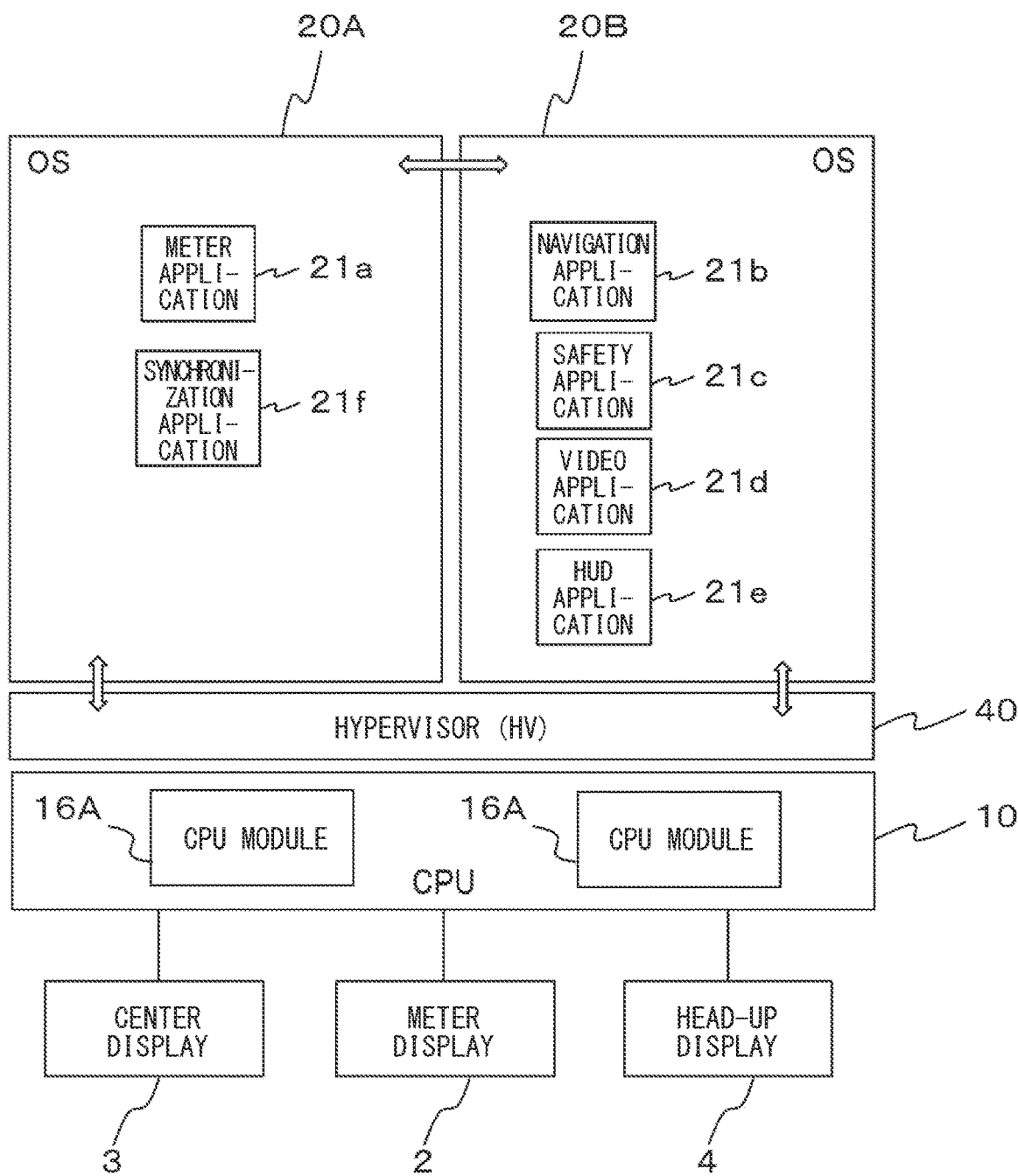
FIG. 12 is a diagram showing a configuration example of a vehicle device according to a second embodiment.

In the first configuration example, as shown in FIG. 12, in the vehicle device 1, a hypervisor 40 is executed on the CPU 10, and multiple, for example, two OSs 20A and 20B are executed on the hypervisor 40. At this time, an OS 20A is allocated to the CPU module 16A, and an OS 20B is allocated to a CPU module 16B. In the present embodiment, it is assumed that the OS 20A is in charge of processing having a relatively high real-time property, and the OS 20B is in charge of processing having a relatively low real-time property.

Therefore, in the OS 20A, for example, a meter application 21a that requires the real-time property is executed, and in the OS 20B, a navigation application 21b, a safety application 21c, a video application 21, an HUD application 21e, and the like that do not require the real-time property as much as the OS 20A are executed. The type of the OS 20 and the arrangement of the applications 21 are merely examples, and the present invention is not limited thereto.

In this case, since a physical surface 30 is managed for each OS 20, a physical surface 30A on which the meter application 21a draws a surface and a physical surface 30B on which the navigation application 21b draws a surface are across CPU modules 16 and the OS 20. In other words, a synchronization unit needs to share the surface across the CPU modules 16 and the OS 20. Even in such a case, by adopting the control method described in the first embodiment, the surfaces drawn on the different physical surfaces 30, here, the physical surfaces 30 on different OS 20 sides on different CPU module 16 sides can be shared and synchronized.

Although in the first embodiment, the configuration in which each surface is used as the synchronization unit by the application 21 that draws the surface by the synchronization unit, that is, the application 21 has been exemplified, a configuration can be adopted in which a synchronization application 21f dedicated to synchronization is implemented and the drawing of the surface and the sharing of the surface are separately processed. In other words, the synchronization unit that draws the surface, which is a content holding unit, on the physical surface 30 allocated to the synchronization unit, and an application 21f serving as a synchronization unit that loads in, into the physical surface 30 allocated to the application 21f, a surface drawn on another physical surface 30 and calculates a position, a size, or a deformation amount of the surface loaded in can be provided. Even with such a configuration, the surfaces drawn on the different physical surfaces 30 can be synchronized by loading in by the synchronization unit the surfaces drawn by the synchronization unit. The synchronization application 21f can be applied to all of the display devices, and can be individually provided in each of the display devices.

The hypervisor 40 may be configured to be executed as a function of the OS 20A. That is, the OS 20A can be executed on the CPU 10, the hypervisor 40 can be operated as a function of the OS 20, and the OS 20B can be executed on the hypervisor 40.

Second Configuration Example

Figure 13:
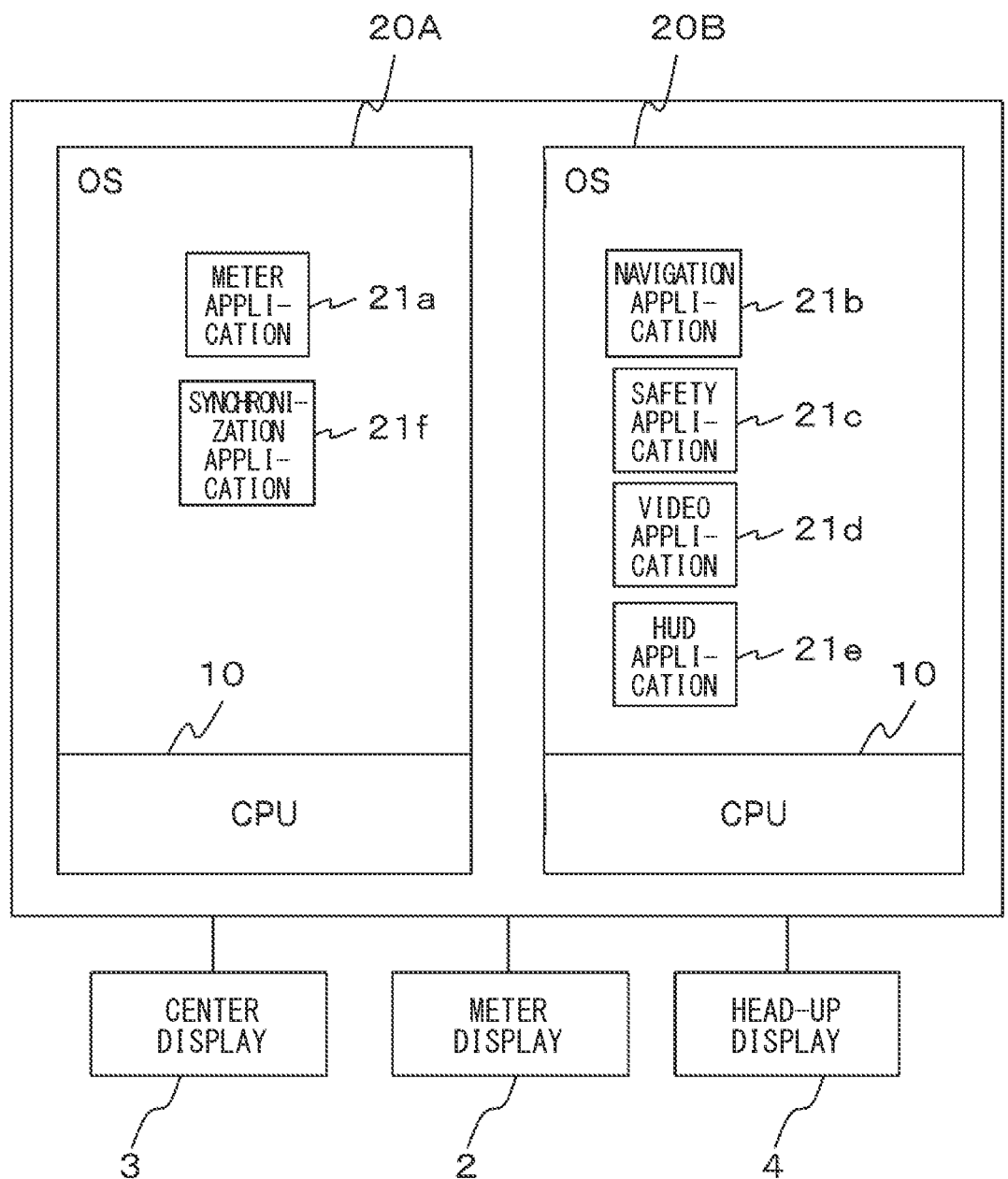
FIG. 13 is a diagram showing another configuration example of the vehicle device.

In the second configuration example, as shown in FIG. 13, the vehicle device 1 includes multiple CPUs 10, and each of the OS 20A and the OS 20B is executed on a respective one of the CPUs 10. In this case, since the physical surface 30 is managed for each CPU 10, the physical surface 30A on which the meter application 21a draws the surface and the physical surface 30B on which the navigation application 21b draws the surface are across the CPU 10.

In other words, the synchronization unit needs to share the surface across the CPU 10. Even in such a case, by adopting the control method described in the first embodiment, the surfaces drawn on the different physical surfaces 30, here, the physical surfaces 30 on different CPU module 16 sides can be shared and synchronized.

Third Embodiment

Next, a third embodiment will be described. In the third embodiment, an example in which surfaces are synchronized between a vehicle device 1 and an ECU 6 will be described. In order to simplify the description, the vehicle device 1, an OS 20, or an application 21 will be described with common reference numerals. The configuration of the vehicle device 1 is similar as that according to the first embodiment or the second embodiment, and a synchronization control method similar as that according to the first embodiment can be adopted.

Figure 14:
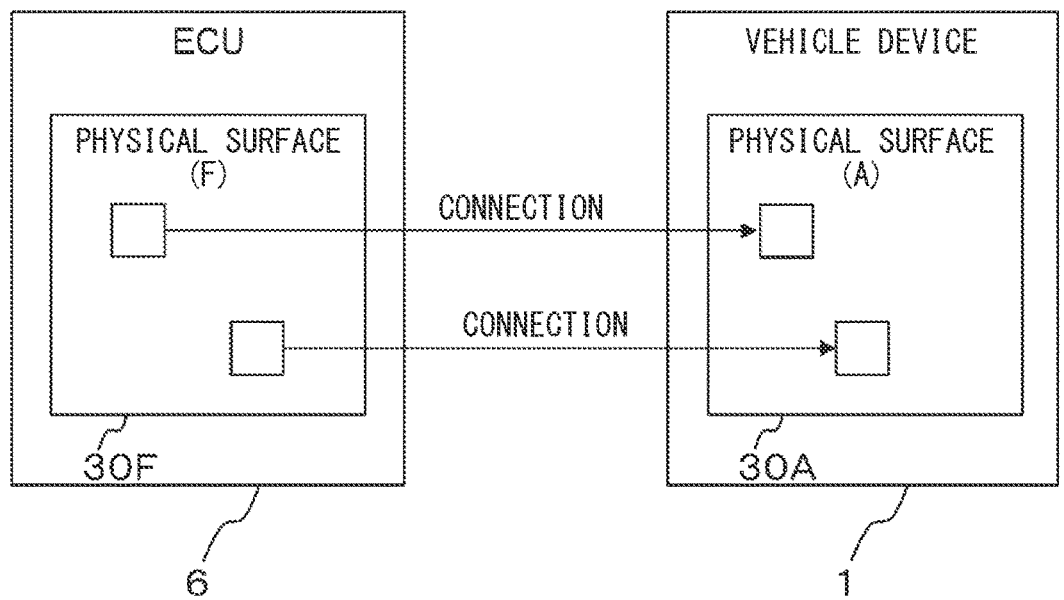
FIG. 14 is one diagram showing an example of a mode of loading in a surface according to a third embodiment.
Figure 15:
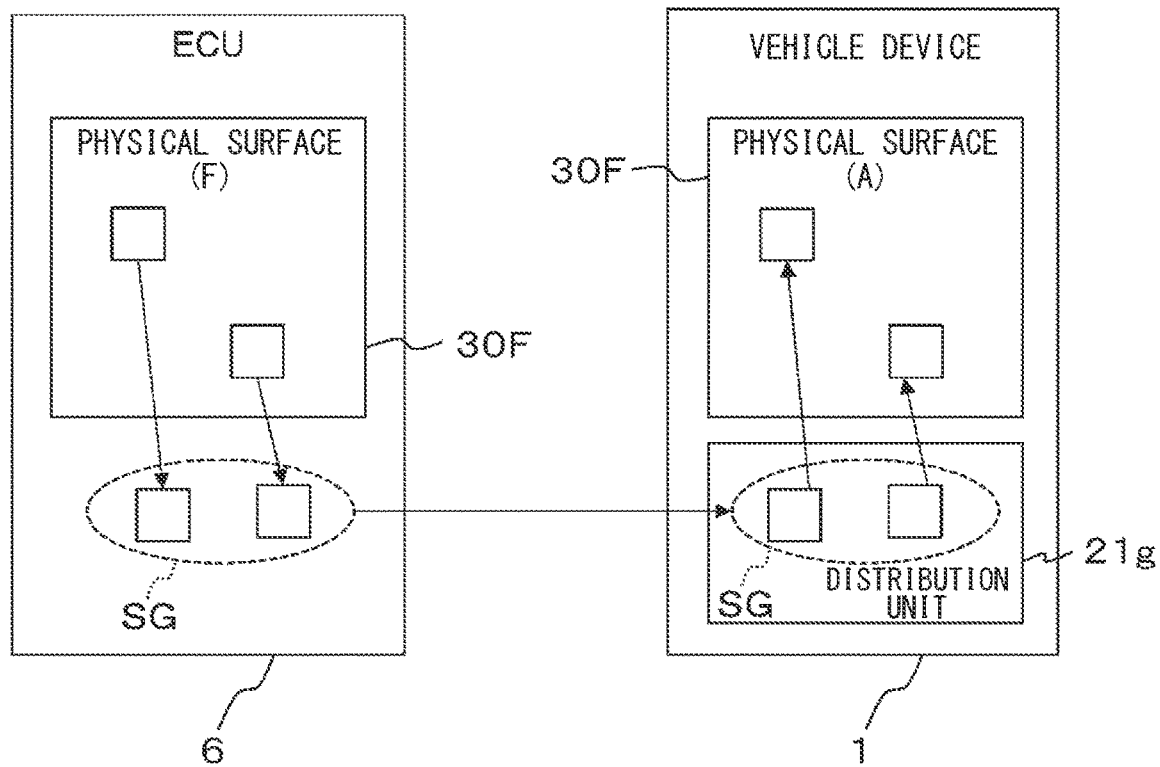
FIG. 15 is another diagram showing the example of a mode of loading in a surface.

In the third embodiment, as shown in FIG. 14, the vehicle device 1 is communicably connected to another ECU 6, and synchronizes, using a similar control method as that according to the first embodiment, a surface drawn on a physical surface 30 by the synchronization unit on a vehicle device 1 side and the surface drawn on another physical surface 30 on an ECU 6 side.

Specifically, in the case of the meter application 21a, for example, the vehicle device 1 loads in the surface drawn on the physical surface 30F into the physical surface 30A of the vehicle device 1, calculates a position, a size, or a deformation amount, draws each surface based on a calculation result, and then displays the surface, thereby synchronizing the surface drawn on the physical surface 30A by the vehicle device 1 with the surface drawn on a different physical surface 30F.

At this time, the vehicle device 1 can individually attach a connection to load in the surface drawn on the physical surface 30F on the ECU 6 side. Accordingly, the necessary surfaces can be individually loaded in, and the surfaces drawn on the different physical surfaces 30 can be synchronized.

Alternatively, the vehicle device 1 can collectively load in a surface group SG in which multiple surfaces drawn on the physical surface 30F on the ECU 6 side are collected on the ECU 6 side, and providing a distribution unit 21g as the application 21 that individually distributes the loaded in surface group SG to, for example, the physical surface 30A allocated to the meter application 21a.

Accordingly, the surfaces drawn on the different physical surfaces 30 can be synchronized while simplifying the processing of loading in the surface and reducing a communication amount between the vehicle device 1 and the ECU 6. The distribution unit 21g may be implemented by hardware.

Fourth Embodiment

Next, a fourth embodiment will be described. In the fourth embodiment and the fifth embodiment to be described later, a method of reducing a load on a cache memory or a bus will be described. Since a configuration of a vehicle device 1 is similar as that according to the first to third embodiments, the description will be made with reference to FIGS. 1 to 15 as necessary.

As shown in FIG. 1, FIG. 12, or FIG. 13, the vehicle device 1 includes multiple CPU modules 16. Each CPU module 16 is individually provided with a cache 17. The vehicle device 1 has an electrical configuration shown in FIG. 2, and each application 21 draws a surface on an individual physical surface 30 as shown in FIG. 7. The physical surface 30 is provided in the cache 17 or a main memory 12.

Figure 16:
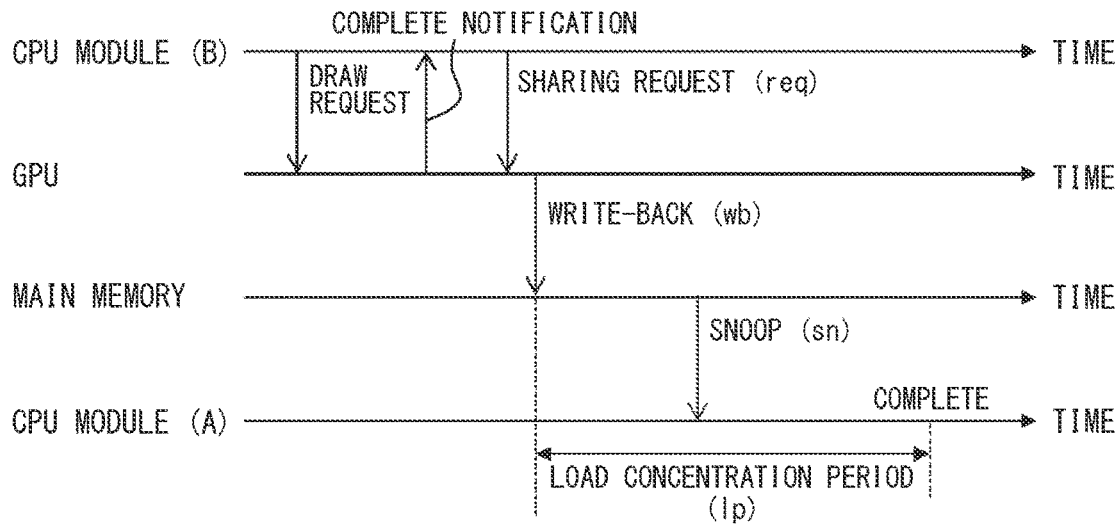
FIG. 16 is a diagram showing a sequence of sharing a surface as a comparative example according to a fourth embodiment.

First, a case in which a surface drawn on a CPU module 16B side is shared on a CPU module 16A side is assumed, and a basic flow when the surface is shared will be described. As shown in FIG. 16, the CPU module 16B outputs a drawing request for actually drawing the shared surface to a GPU 13. The drawing request is output from the CPU module B to the GPU 13 as indicated by an arrow F1 shown in FIG. 17. Prior to the operations, the CPU module 16A notifies the CPU module 16B that the surface is shared.

Figure 17:
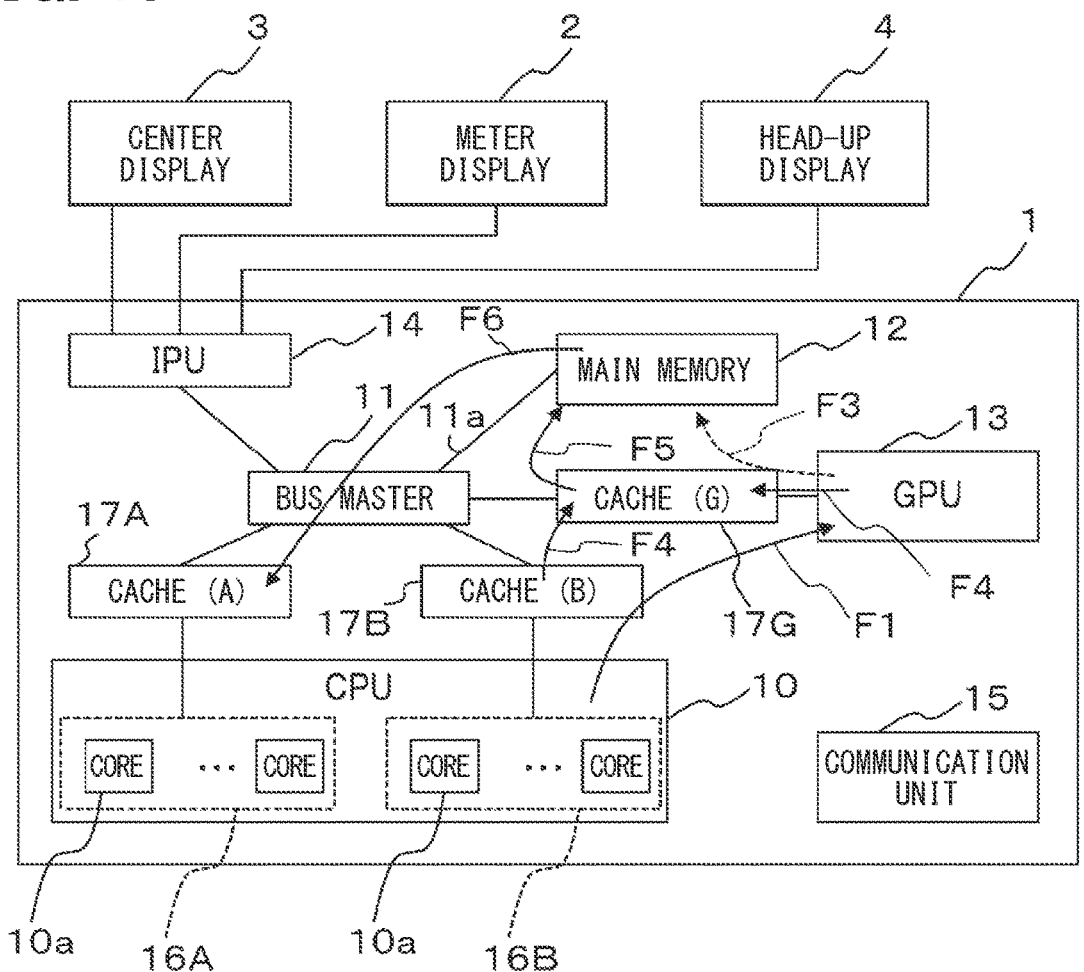
FIG. 17 is a diagram showing an example of order in which the surface is shared.

Upon receiving the drawing request, the GPU 13 draws a surface in a cache 17G of the GPU 13 as indicated by an arrow F2 in FIG. 17. At this time, the GPU 13 writes back an amount that is not stored in the cache 17G to the main memory 12 at any time as indicated by an arrow F3 shown in FIG. 17.

When the drawing is completed, as shown in FIG. 16, the GPU 13 notifies the CPU module B of a completion of the drawing. However, in a drawing method in the related arts, the completion of the drawing is notified when the drawing of an entire surface is completed.

The CPU module B that has received the notification of the completion of the drawing outputs a sharing request for sharing the surface to the GPU 13. Hereinafter, the sharing request is also referred to as req. The sharing request is output from a CPU module B side to the GPU 13 as indicated by an arrow F4 shown in FIG. 17.

Upon receiving the sharing request, the GPU 13 writes back a target surface to the main memory 12. Hereinafter, the write-back is also referred to as wb. At this time, if the surface is provided on the cache 17G, a write back from the cache 17G to the main memory 12 is executed as indicated by an arrow F5 shown in FIG. 17.

Thereafter, as shown in FIG. 16, snoop from the main memory to a CPU module A side is executed. Hereinafter, snoop is also referred to as sn. The snoop is executed from the main memory 12 to the cache 17A of the CPU module A as indicated by an arrow F6 shown in FIG. 17. Accordingly, the surfaces to be shared among the caches provided in the CPU modules 16 are synchronized.

The sharing request indicated by the arrow F4, the write-back indicated by the arrow F5, and the snoop indicated by the arrow F6 in FIG. 17 occur each time the surface is shared. Therefore, each time a surface is shared, a load is applied to the bus 11a, and a latency increases.

In the case of the drawing method in the related arts described above, the sharing request is output at the timing when the entire surface is drawn. Therefore, as a load concentration period shown in FIG. 16, the load is concentrated at the timing, and the snoop is required for the entire surface. Therefore, a period required until one snoop is completed is long. As a result, display or the like on the meter display requiring the real-time property may not be executed smoothly. Hereinafter, the load concentration period is also referred to as lp for convenience.

Therefore, in the vehicle device 1, a bus load is reduced in the following manner. Although in the following description, the vehicle device 1 will be mainly described for simplification of description, the processing is performed by the CPU module 16 and the GPU 13 in cooperation with each other. That is, in the present embodiment, the CPU module 16 and the GPU 13 function as a memory synchronization unit that synchronizes multiple caches 17. More specifically, the CPU module 16, the OS 20, the application 21, the GPU 13 that receives an instruction from the CPU module 16 side, or the like can constitute a memory synchronization unit.

Figure 18:
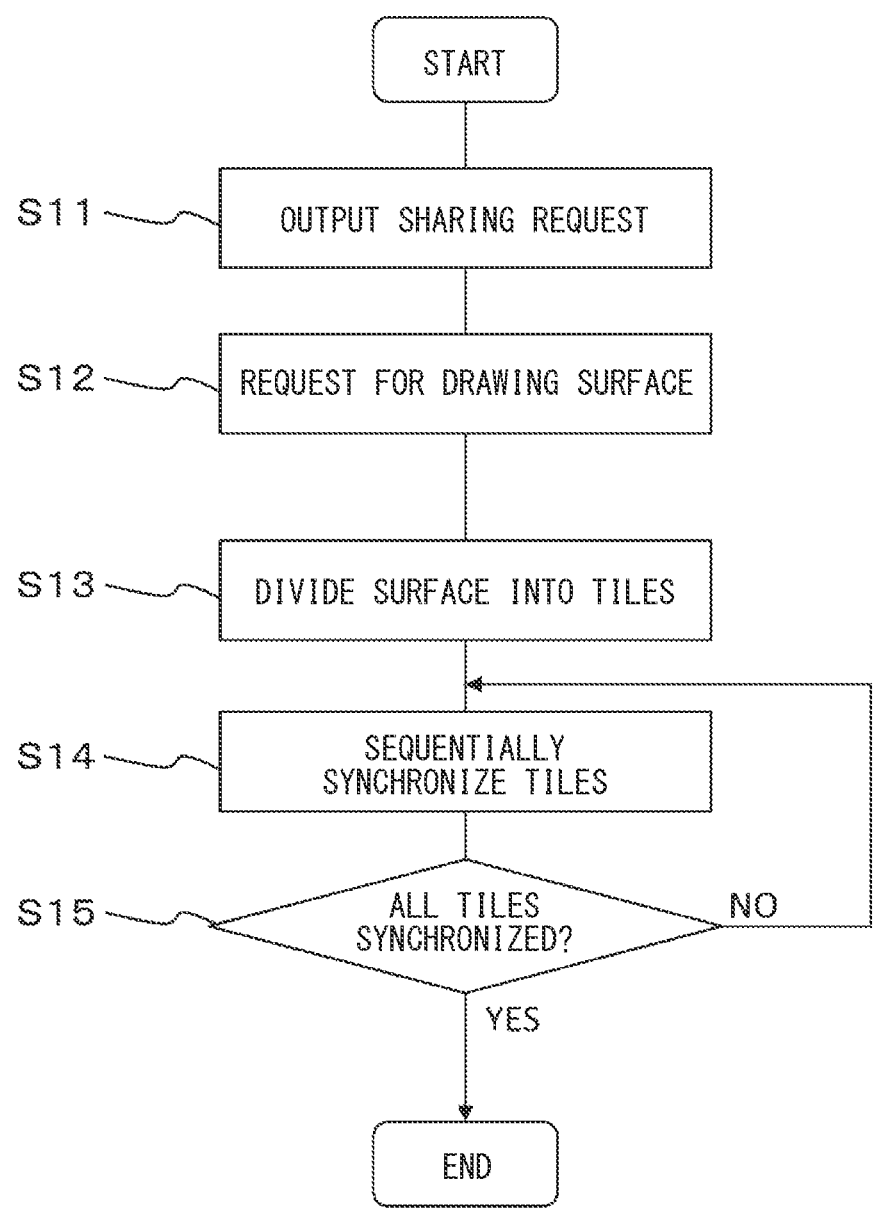
FIG. 18 is a diagram showing a flow of memory synchronization processing.
Figure 19:
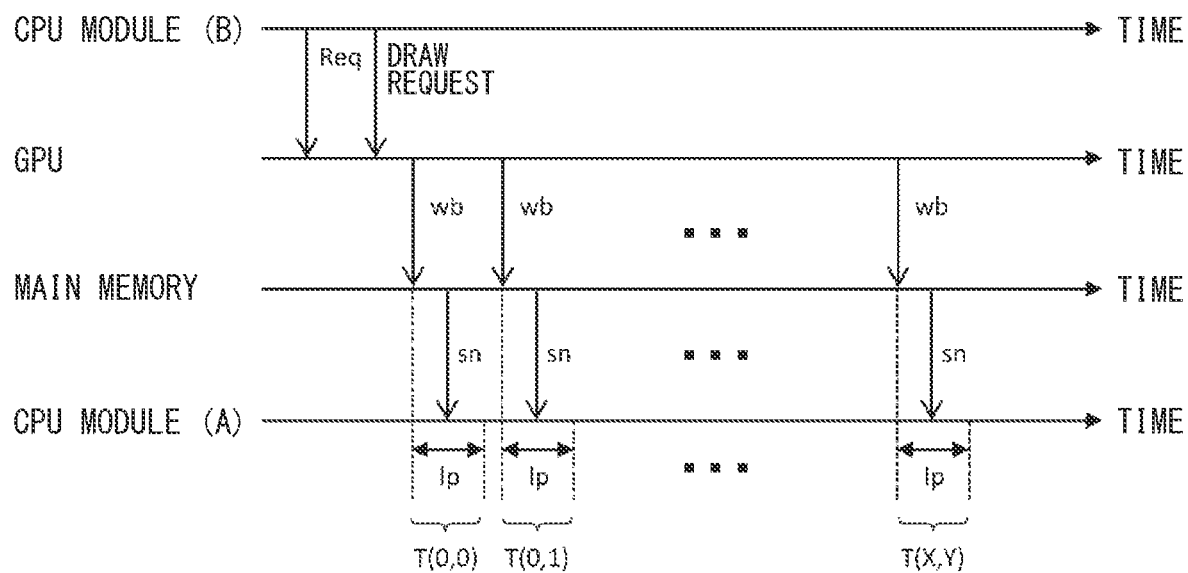
FIG. 19 is a diagram showing a sequence of sharing a surface.

The vehicle device 1 executes the processing shown in FIG. 18, and first outputs the sharing request. Specifically, as shown in FIG. 19 as an embodiment, the sharing request is output from the CPU module 16B to the GPU 13. The sharing request is to notify the GPU 13 that the surface under a next drawing request is to be shared.

Subsequently, in step S12 in FIG. 18, the vehicle device 1 outputs a drawing request for actually drawing the surface. In this case, as shown in FIG. 19, the CPU module 16B outputs the drawing request to the GPU 13.

Figure 20:
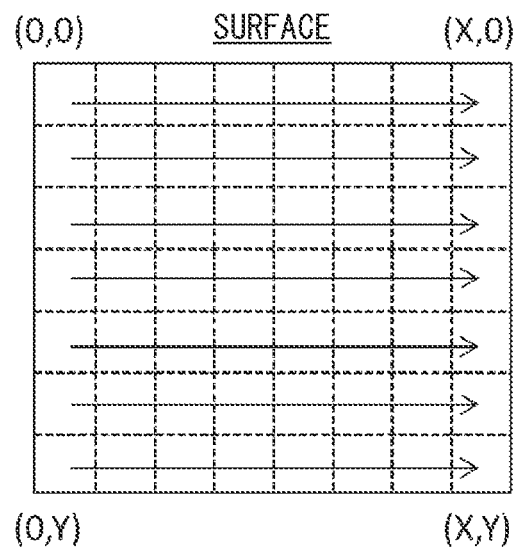
FIG. 20 is a diagram showing a path for synchronizing tiles.

Subsequently, in step S13 in FIG. 18, the vehicle device 1 divides the surface into multiple tiles. In this case, as shown in FIG. 20, the vehicle device 1 divides one surface into multiple tiles in a two-dimensional array from T (0, 0) to T (X, Y), for example. Then, in step S14 in FIG. 18, the vehicle device 1 sequentially executes synchronization from the tiles for which the drawing has been completed.

That is, the vehicle device 1 sequentially writes back the tiles to the main memory 12, thereby providing the shared surfaces in the main memory 12 and enabling synchronization. In other words, the shared surfaces are not cached. The surfaces that are not shared are provided in the cache 17.

At this time, for example, as a path indicated by arrows in FIG. 20, the vehicle device 1 synchronizes the tiles in a path from T (0, 0) toward T (X, 0) such as T (1, 0), then synchronizes the tiles in a path from T (1, 0) toward T (1, Y), and finally sequentially synchronizes the tiles in the surface in a lateral direction in a path from T (0, Y) toward T (X, Y). That is, the vehicle device 1 sequentially synchronizes the tiles in the path in which the same tiles do not overlap each other. Tiles for which drawing has not been completed are skipped.

Then, in step S15 in FIG. 18, the vehicle device 1 determines whether all tiles have been synchronized. When not all tiles have been synchronized, the vehicle device 1 determines NO in step S15, and synchronizes the tiles that have not yet been synchronized. In this case, the tiles that have already been synchronized are skipped.

In this case, as shown in FIG. 19, the tiles are sequentially written back to the main memory 12 from the tile in which the drawing has been completed, and are snooped to the CPU module 16A side. In other words, unlike the drawing method in the related arts in FIG. 16 described above, the write-back and the snoop for one surface are executed in a distributed manner multiple times. Since the writing back is executed for each tile, a period until one snoop is completed is shorter than that of the drawing method in the related arts.

Accordingly, the bus load when the caches 17 is synchronized can be reduced. That is, according to the vehicle device 1 and the control method, the bus load can be distributed, and a period required until one snoop is completed can be shortened. Therefore, the display or the like on the meter display that requires the real-time property can be smoothly executed.

According to the vehicle device 1 described above, following effects can be attained.

The vehicle device 1 includes multiple CPU modules 16, multiple caches 17 respectively allocated to the multiple CPU modules 16, and a memory synchronization unit that includes the CPU modules 16 and the GPU 13 according to the present embodiment and that synchronizes the multiple caches 17. Then, the memory synchronization unit synchronizes the surfaces drawn in the cache 17, divides the surfaces to be synchronized into multiple tiles, and sequentially synchronizes the surfaces from the tile in which the drawing has been completed among the divided tiles.

Accordingly, the bus load when the caches 17 is synchronized can be reduced. The bus load can be distributed, and the period required until one snoop is completed can be shortened. Therefore, the load on the cache 17 and the bus 11a can be reduced. The display or the like on the meter display that requires the real-time property can be smoothly executed.

Similarly, the loads on the cache 17 and the bus 11a can be reduced according to the control method of the vehicle device 1 including the processing of dividing the surface drawn in the multiple caches 17 respectively allocated to the CPU modules 16 into multiple tiles, and the processing of sequentially synchronizing the surfaces from the tile in which the drawing has been completed among the divided tiles.

The vehicle device 1 provides a surface used by the single CPU module 16 in the cache 17, and provides a surface shared with another CPU module 16 in the main memory 12. Accordingly, a surface used alone can be drawn at high speed, and the shared surface can be used from another CPU module. Therefore, it is significant when multiple contents are provided using one user interface.

The vehicle device 1 divides the surface into rectangular tiles, and sequentially synchronizes the tiles along a path that does not overlap the same tile. More specifically, the vehicle device 1 synchronizes all tiles in the surface without overlapping tiles for which the synchronization has been completed. Accordingly, unnecessary synchronization processing, that is, the occurrence of a bus load can be prevented.

In the vehicle device 1, the OS 20 is executed on each of the multiple CPU modules 16. That is, in the case of the vehicle device 1, the surface is shared across the OS 20. Accordingly, even when the OS 20 is separately implemented according to the real-time property or a multimedia performance, the surface can be suitably shared.

The vehicle device 1 controls display on multiple display devices. In this case, it is assumed that surfaces drawn on the different applications 21, the different OSs 20, or the different CPU modules 16 side are required in each display device. Even in such a case, the load on the cache 17 and the bus 11a can be reduced by adopting the vehicle device 1 or the above-described control method, and thus the surface can be seamlessly and smoothly shared.

The configuration and the method according to the fourth embodiment and the fifth embodiment described below can be adopted in combination with a configuration and a method according to the sixth embodiment described later. That is, the configuration in which the bus load according to the present embodiment is distributed and the configuration in which the bus load itself is reduced, which will be described later, can be combined with each other.

Fifth Embodiment

Next, the fifth embodiment will be described. In the fifth embodiment, another route when tiles are synchronized will be described.

Figure 21:
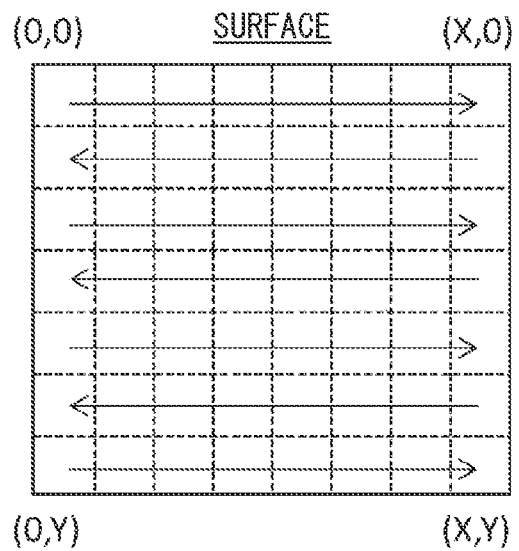
FIG. 21 is one diagram showing a path for synchronizing tiles according to a fifth embodiment.

When the vehicle device 1 is divided into multiple tiles in a two-dimensional array from T (0, 0) to T (X, Y), for example, as in a path indicated by an arrow in FIG. 21, after the tiles have been synchronized in a path from T (0, 0) toward T (X, 0), the tiles are synchronized in a path from T (X, 1) toward T (0, 1), and then the tiles are synchronized in a path from T (0, 2) toward T (X, 2). Accordingly, the tiles can be synchronized in a path that reciprocates in a horizontal direction in the surface. Even in such a path, the tiles in a route that does not overlap the same tile can be sequentially synchronized.

Figure 22:
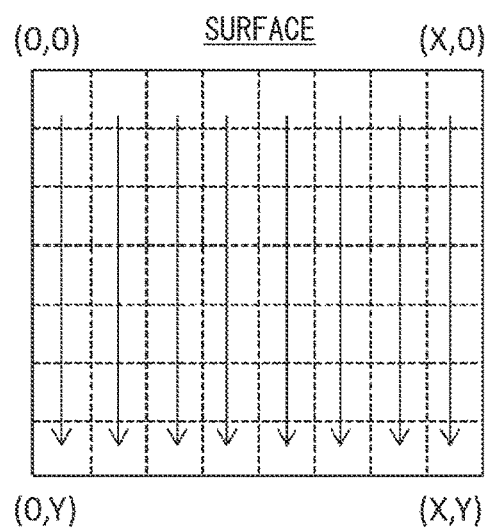
FIG. 22 is another diagram showing the path for synchronizing tiles.

When the vehicle device 1 is divided into multiple tiles in a two-dimensional array from T (0, 0) to T (X, Y), for example, as in a path indicated by an arrow in FIG. 22, after the tiles have been synchronized in a path from T (0, 0) toward T (0, Y), the tiles are synchronized in a path from T (1, 0) toward T (1, Y), and then the tiles are synchronized in a path from T (0, 2) toward T (X, 2). Accordingly, the tiles can be synchronized in a path that is toward a vertical direction in the surface. Even in such a path, the tiles in a route that does not overlap the same tile can be sequentially synchronized.

Figure 23:
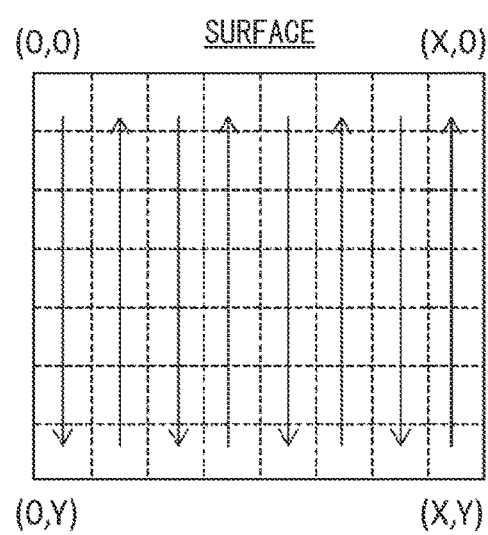
FIG. 23 is another diagram showing the path for synchronizing tiles.

When the vehicle device 1 is divided into multiple tiles in a two-dimensional array from T (0, 0) to T (X, Y), for example, as in a path indicated by an arrow in FIG. 23, after the tiles have been synchronized in a path from T (0, 0) toward T (0, Y), the tiles are synchronized in a path from T (1, Y) toward T (1, 0), and then the tiles are synchronized in a path from T (2, 0) toward T (2, Y). Accordingly, the tiles can be synchronized in a path that reciprocates in the vertical direction in the surface. Even in such a path, the tiles in a route that does not overlap the same tile can be sequentially synchronized.

Figure 24:
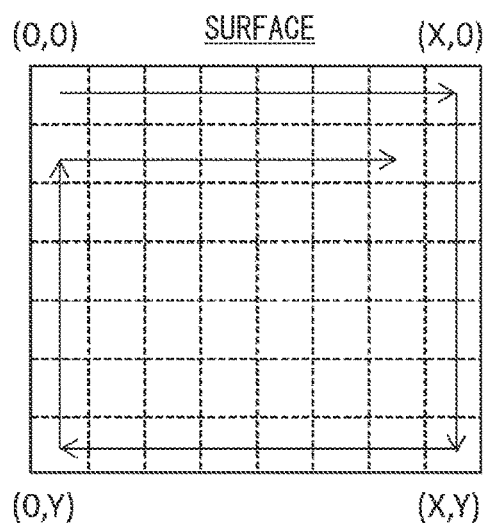
FIG. 24 is another diagram showing the path for synchronizing tiles.

When the vehicle device 1 is divided into multiple tiles in a two-dimensional array from T (0, 0) to T (X, Y), for example, as in a path indicated by an arrow in FIG. 24, after the tiles have been synchronized in a path from T (0, 0) toward T (X, 0), the tiles are synchronized in a path toward T (X, Y), and then the tiles are synchronized in a path toward T (0, Y). Accordingly, the tiles can be synchronized with each other in a path that goes around in the surface from an outer edge toward a center. Even in such a path, the tiles in a route that does not overlap the same tile can be sequentially synchronized. On the contrary, the tiles can be synchronized in a path that goes around from the center of the surface toward the outer edge of the surface.

Sixth Embodiment

Next, the sixth embodiment will be described. In the sixth embodiment, a method for reducing a load on a cache memory or a bus, which is different from those according to the fourth embodiment and the fifth embodiment, will be described. Since a configuration of a vehicle device 1 is similar as that according to the first to third embodiments, the description will be made with reference to FIGS. 1 to 15 as necessary. Since the bus load is similar as that according to the fourth embodiment, the bus load will be described with reference to FIG. 17 and the like.

As shown in FIG. 2, FIG. 12, or FIG. 13, the vehicle device 1 includes multiple CPU modules 16. In the vehicle device 1, multiple OSs 20 are executed as shown in FIG. 12 or 13. Each CPU module 16 is individually provided with a cache 17 and is connected to the corresponding cache 17 by a bus (a first bus). The vehicle device 1 has an electrical configuration shown in FIG. 2, and each application 21 draws a surface on an individual physical surface 30 as shown in FIG. 7. The physical surface 30 is provided in the cache 17 or a main memory 12.

Figure 25:
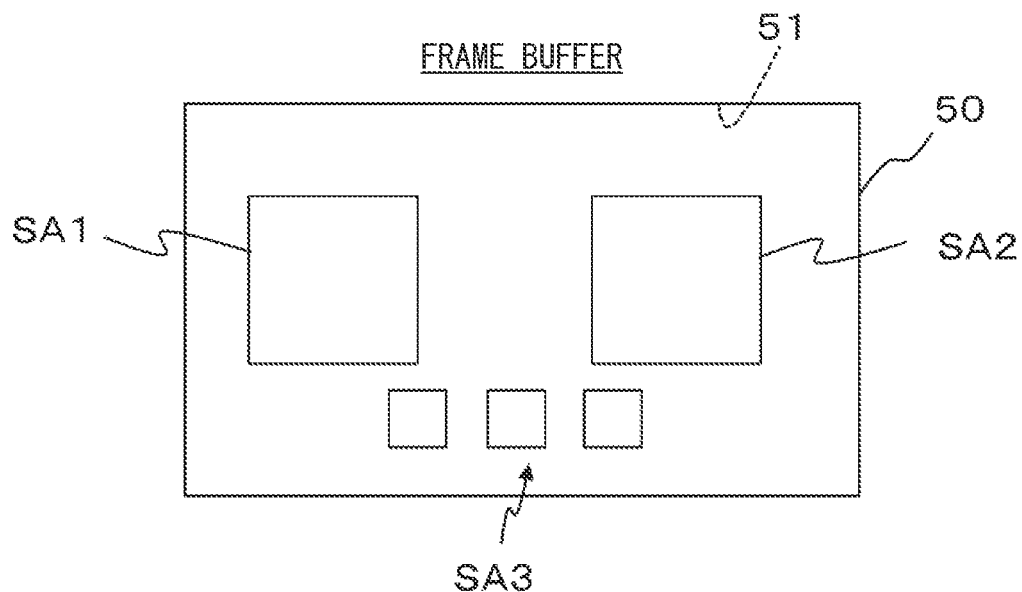
FIG. 25 is a diagram showing an example of specifying an arrangement region according to a sixth embodiment.

For example, the surfaces SA1 to SA3 drawn on the physical surface 30A are provided in a frame buffer 50 as shown in FIG. 25, and then output to the display device. The frame buffer 50 is obtained by combining the surfaces based on an XY two-dimensional coordinate system. Therefore, by displaying the surface provided in the frame buffer, contents are visually recognizable to the user. The frame buffer 50 is provided on, for example, a main memory. The frame buffer 50 is provided as an individual region in each display device.

As shown in FIG. 17 in the fourth embodiment, when the surface is shared across the CPU module 16 and the OS 20, the bus load is generated to synchronize the caches 17. In other words, it is considered that the write-back to the main memory 12 and the snoop to the cache 17 are not necessary for the surfaces that are not across the CPU module 16 and the OS 20.

Therefore, in the vehicle device 1, unnecessary write-back and snoop are prevented from occurring in the following manner. Specifically, the vehicle device 1 executes a region arrangement process shown in FIG. 26, and specifies, for example, a shared region 51 shown in FIG. 25 at step S21. In the case of FIG. 25, the vehicle device 1 specifies the entire frame buffer 50 as the shared region 51. The specification is executed by the CPU module 16 in the present embodiment.

Figure 26:
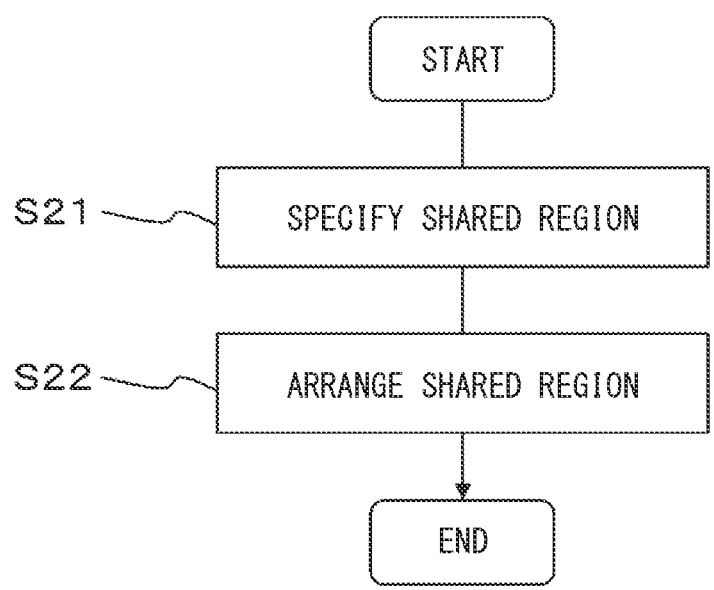
FIG. 26 is a diagram showing a flow of region arrangement processing.

Then, at step S22 in FIG. 26, the vehicle device 1 synchronizes the identified shared region 51. In this case, the vehicle device 1 is provided in the main memory 12 assuming that the entire frame buffer 50 is shared by the multiple CPU modules 16. Accordingly, the entire frame buffer 50 can be shared.

The arrangement is performed by the CPU module 16 and a GPU 13. That is, the CPU module 16 and the GPU 13 constitute an arrangement unit. More specifically, the CPU module 16, the OS 20, the application 21, the GPU 13 that receives an instruction from a CPU module 16 side, or the like can constitute the arrangement unit.

Accordingly, with respect to the arrangement of the shared region 51 in the frame buffer 50, write-back or snoop to another CPU module 16 side is not executed. Therefore, an unnecessary bus load can be prevented from being generated. Therefore, the load on the cache memory and the bus can be reduced.

According to the vehicle device 1 and the control method described above, following advantages can be attained.

The vehicle device 1 includes multiple CPU modules 16, the cache 17 allocated to the multiple CPU modules 16, the CPU module 16 serving as a specifying unit that specifies a shared region 51 shared by the multiple CPU modules 16, and the CPU module 16 and the GPU 13 serving as an region arrangement unit that arranges the shared region 51 specified by the specifying unit in the main memory 12.

Accordingly, although write-back or snoop occurs in the shared region 51 that needs to be shared, write-back or snoop does not occur in the region that does not need to be shared, and it is possible to prevent an unnecessary bus load from generating.

In the vehicle device 1 including the multiple CPU modules 16, the load on the cache memory and the bus can be reduced according to a control method including processing of specifying the shared region 51 shared by the multiple CPU modules 16 and processing of providing the specified shared region 51 in the main memory 12.

The vehicle device 1 specifies the entire frame buffer 50 as the shared region 51. Accordingly, all surfaces necessary for providing the user interface can be shared.

When a user interface is provided, it may not be necessary to always update the entire screen. It is considered that the bus load can be further reduced by not sharing a part of the screen which does not need to be updated.

Figure 27:
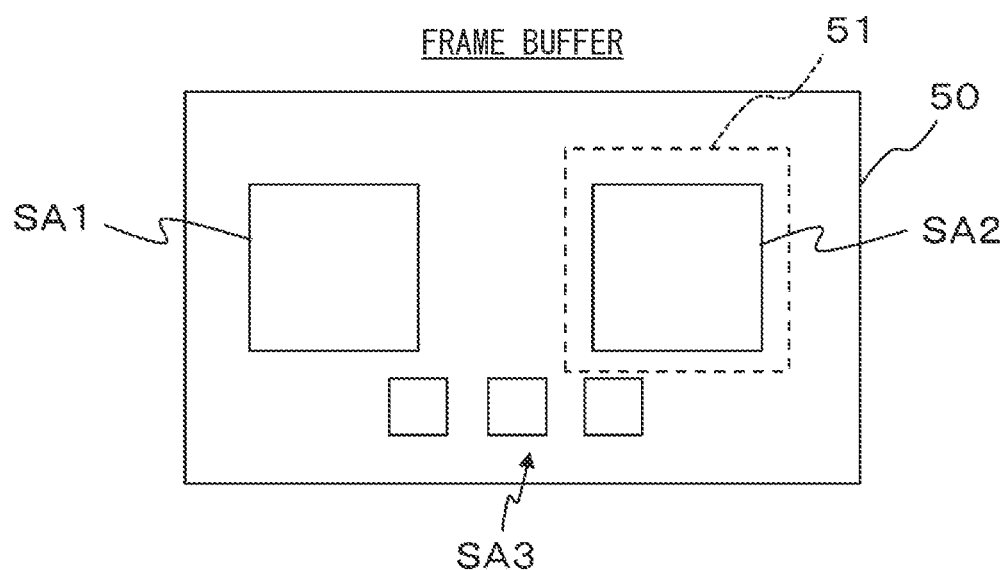
FIG. 27 is one diagram showing an example of specifying another arrangement region.

Therefore, for example, as shown in FIG. 27, the vehicle device 1 can specify a part of the frame buffer 50 as the shared region 51. In this case, the vehicle device 1 can set a rectangular region in the frame buffer 50 and specifying the region as the shared region 51. Alternatively, the vehicle device 1 can set a region in the frame buffer 50 by a pixel map and specifying the region as the shared region 51. Even with such a configuration, unnecessary write-back and snoop can be reduced, and the load on the cache memory and the bus can be reduced.

Figure 28:
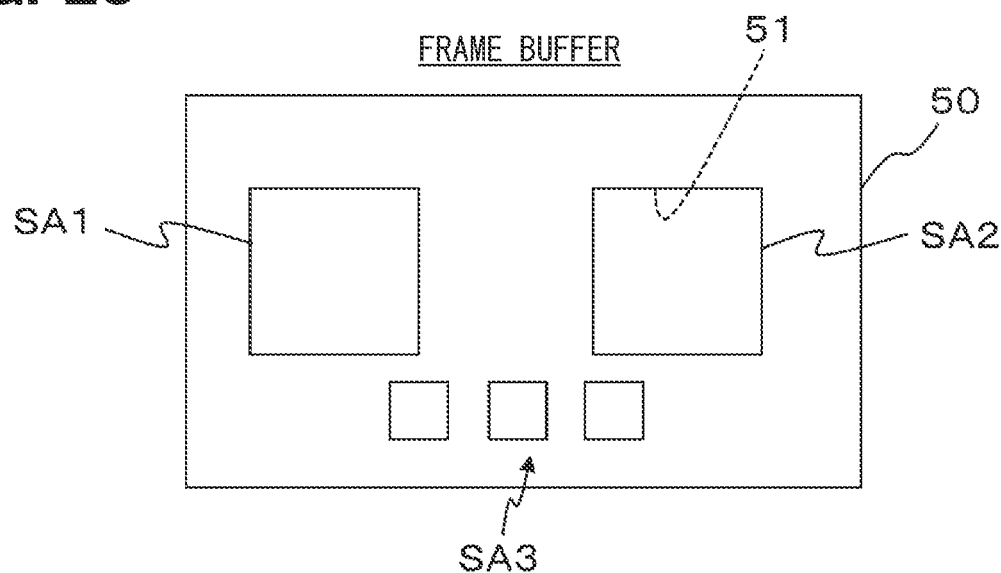
FIG. 28 is another diagram showing the example of specifying another arrangement region.
Figure 29:
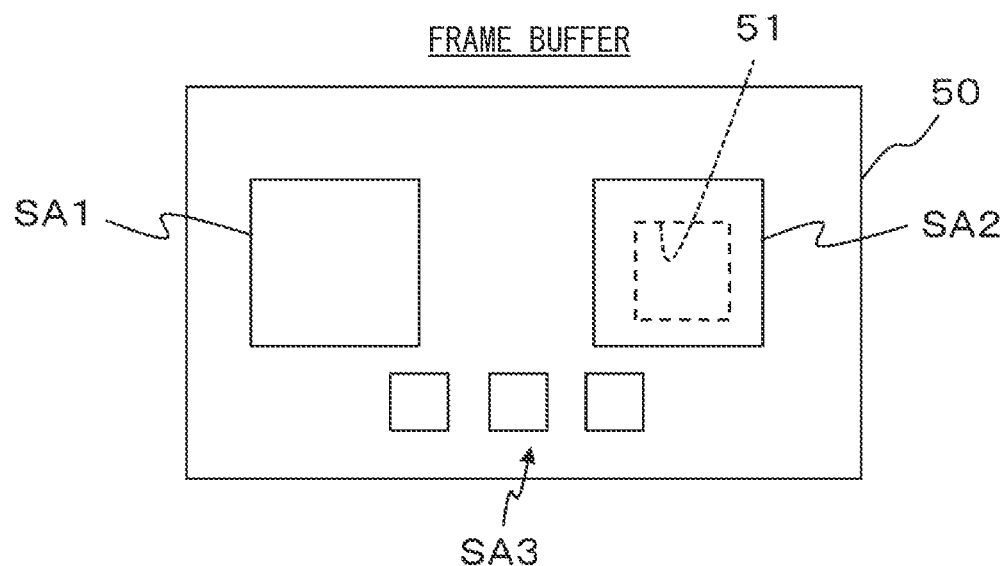
FIG. 29 is another diagram showing the example of specifying another arrangement region.
Figure 30:
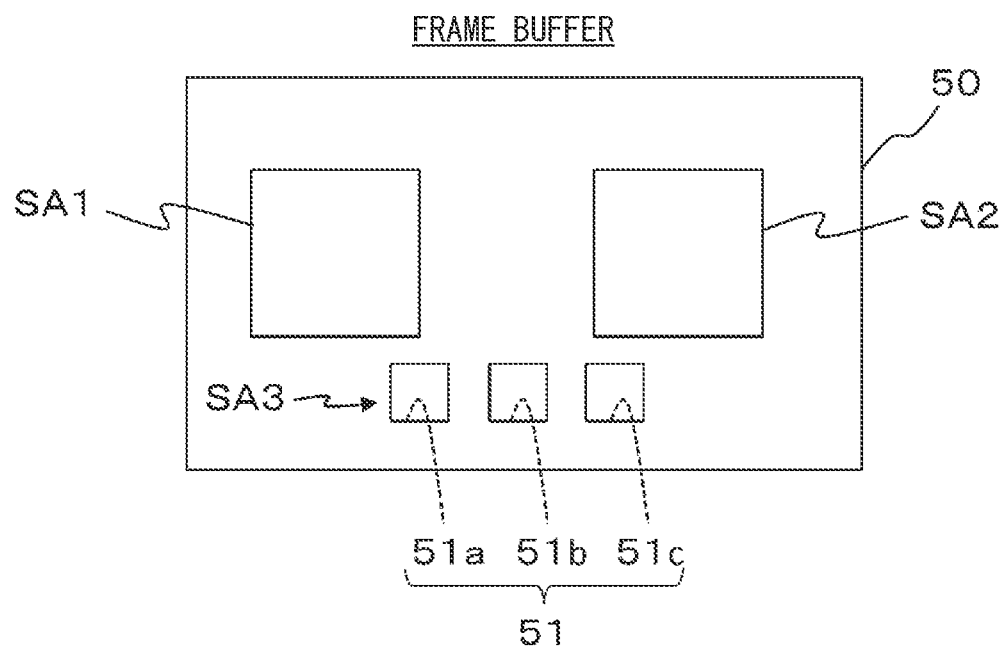
FIG. 30 is another diagram showing the example of specifying another arrangement region.

For example, as shown in FIG. 28, the vehicle device 1 can specify one surface as the shared region 51. For example, as shown in FIG. 29, the vehicle device 1 can set a rectangular region in the surface and specifying the region as the shared region 51. For example, as shown in FIG. 30, the vehicle device 1 can set a region by a pixel map in the surface and specifying the region as the shared region 51. Even with such a configuration, unnecessary write-back and snoop can be reduced, and the load on the cache memory and the bus can be reduced.

The configuration and method according to the sixth embodiment can be adopted in combination with the configurations and methods according to the fourth embodiment and the fifth embodiment described above. That is, the configuration of reducing the bus load itself according to the present embodiment and the configuration of distributing the bus load described above can be combined with each other.

Although the present disclosure has been described in accordance with the examples, it is understood that the present disclosure is not limited to the embodiments and the structures. The present disclosure includes various modifications and deformations within an equivalent range. In addition, various combinations and forms, and further, other combinations and forms including only one element, more than one element, or less than one element are also included in the scope and spirit of the present disclosure.

The controller and the method described in the present disclosure may be implemented by a dedicated computer including a processor programmed to execute one or more functions embodied by a computer program and a memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may also be stored on a computer-readable non-transitory tangible storage medium as instructions to be executed by a computer.

The invention claimed is:

1. A vehicle device comprising:
 a plurality of CPU modules in a vehicle for drawing a surface on at least one display of the vehicle;
 a graphic processing unit (GPU) in the vehicle;
 a plurality of cache memories in the vehicle each of which is dedicatedly provided for a respective one of the plurality of CPU modules, each of the plurality of cache memories being connected to a corresponding one of the plurality of CPU modules via a first bus;
 a specifying unit configured to specify, as a shared region shared by the plurality of CPU modules, a region in a frame buffer corresponding to the surface, and the specifying unit being implemented by the plurality of CPU modules; and
 a region arrangement unit configured to arrange, after synchronization, the shared region specified by the specifying unit in a main memory that is connected by a second bus via a bus master through which the plurality of CPU modules are accessible to the main memory, the region arrangement unit being implemented by the plurality of CPU modules and the GPU, wherein
 the shared region shared by the frame buffer is shared across the plurality of CPU modules, and
 the shared region arranged in the frame buffer after synchronization is not written back and snooped to the plurality of CPU modules.

2. The vehicle device according to claim 1, wherein
 each of the plurality of CPU modules is configured to draw a corresponding surface,
 a surface solely used by one of the plurality of CPU modules is arranged in the cache memory, and
 a surface shared with two or more of the plurality of CPU modules is arranged in the main memory.

3. The vehicle device according to claim 1, wherein an operating system is executed on each of the plurality of CPU modules.

4. The vehicle device according to claim 1, wherein the region arrangement unit specifies an entire frame buffer as the shared region.

5. The vehicle device according to claim 1, wherein the region arrangement unit specifies a part of a frame buffer as the shared region.

6. The vehicle device according to claim 1, wherein the region arrangement unit specifies the surface as the shared region.

7. The vehicle device according to claim 1, wherein the region arrangement unit specifies a part of the surface as the shared region.

8. The vehicle device according to claim 1, wherein the region arrangement unit specifies, as the shared region, a surface group formed of a plurality of surfaces.

9. A control method of a vehicle device including a plurality of CPU modules in a vehicle for drawing a surface, each of the plurality of CPU modules being connected to a respective one of a plurality of cache memories in the vehicle via a first bus, the control method comprising:
 specifying, as a shared region shared by the plurality of CPU modules in the vehicle, a region in a frame buffer in the vehicle corresponding to the surface; and
 arranging, after synchronization, the specified shared region in a main memory in the vehicle that is connected by a second bus via a bus master through which the plurality of CPU modules are accessible to the main memory, wherein
 the shared region shared by the frame buffer is shared across the plurality of CPU modules, and
 the shared region arranged in the frame buffer after synchronization is not written back and snooped to the plurality of CPU modules.

* * * * *